(12) United States Patent
Trepagnier et al.

(10) Patent No.: US 8,346,480 B2
(45) Date of Patent: Jan. 1, 2013

(54) NAVIGATION AND CONTROL SYSTEM FOR AUTONOMOUS VEHICLES

(75) Inventors: Paul Gerard Trepagnier, Metairie, LA (US); Jorge Emilio Nagel, Caracas (VE); Powell McVay Kinney, Slidell, LA (US); Matthew Taylor Dooner, New Orleans, LA (US); Bruce Mackie Wilson, Metairie, LA (US); Carl Reimers Schneider, Jr., Metairie, LA (US); Keith Brian Goeller, Covington, LA (US)

(73) Assignee: Gray & Company, Inc., Metairie, LA (US)

( * ) Notice: Subject to any disclaimer, the term of this patent is extended or adjusted under 35 U.S.C. 154(b) by 0 days.

(21) Appl. No.: 13/240,576

(22) Filed: Sep. 22, 2011

(65) Prior Publication Data

US 2012/0035788 A1 Feb. 9, 2012

Related U.S. Application Data

(63) Continuation of application No. 11/376,160, filed on Mar. 16, 2006, now Pat. No. 8,050,863.

(51) Int. Cl.
*G01S 13/88* (2006.01)
(52) U.S. Cl. ........ 701/514; 701/408; 701/494; 701/503; 701/519; 701/301; 340/436; 180/167
(58) Field of Classification Search .............. 701/23–28, 701/116–117, 120–122, 200, 207–211, 220, 701/223, 300–302; 180/167–170, 232, 9.32; 340/995.1–995.28, 961, 980, 425.5, 435–436, 340/438, 901, 903; 342/42, 61, 69, 70
See application file for complete search history.

(56) References Cited

U.S. PATENT DOCUMENTS

| 4,342,997 | A |   | 8/1982 | Evans |
| 4,646,244 | A | * | 2/1987 | Bateman et al. .............. 701/301 |
| 4,649,390 | A |   | 3/1987 | Andrews et al. |
| 5,198,819 | A |   | 3/1993 | Susnjara |

(Continued)

OTHER PUBLICATIONS

Hongling Wang et al., "Steering Autonomous Driving Agents Through Intersections in Virtual Urban Environments", 2004 International Conference on Modeling, Simulation and Visualization Methods (MSV'04) pp. 1-7.

(Continued)

*Primary Examiner* — Thomas Tarcza
*Assistant Examiner* — Rami Khatib
(74) *Attorney, Agent, or Firm* — Oblon, Spivak, McClelland, Maier & Neustadt, L.L.P.

(57) ABSTRACT

A navigation and control system including a sensor configured to locate objects in a predetermined field of view from a vehicle. The sensor has an emitter configured to repeatedly scan a beam into a two-dimensional sector of a plane defined with respect to a first predetermined axis of the vehicle, and a detector configured to detect a reflection of the emitted beam from one of the objects. The sensor includes a panning mechanism configured to pan the plane in which the beam is scanned about a second predetermined axis to produce a three dimensional field of view. The navigation and control system includes a processor configured to determine the existence and location of the objects in the three dimensional field of view based on a position of the vehicle and a time between an emittance of the beam and a reception of the reflection of the emitted beam from one of the objects.

20 Claims, 16 Drawing Sheets

U.S. PATENT DOCUMENTS

| | | | |
|---|---|---|---|
| 5,200,606 | A | 4/1993 | Krasutsky et al. |
| 5,202,695 | A | 4/1993 | Hollandsworth et al. |
| 5,243,553 | A | 9/1993 | Flockencier |
| 5,410,346 | A * | 4/1995 | Saneyoshi et al. ............ 348/116 |
| 5,424,823 | A | 6/1995 | Nettles et al. |
| 5,448,233 | A * | 9/1995 | Saban et al. ................... 340/963 |
| 5,557,282 | A | 9/1996 | Mertens |
| 5,617,085 | A | 4/1997 | Tsutsumi et al. |
| 5,644,386 | A | 7/1997 | Jenkins et al. |
| 5,731,780 | A | 3/1998 | Bleijerveld |
| 5,793,310 | A * | 8/1998 | Watanabe et al. ........ 340/995.14 |
| 5,870,181 | A | 2/1999 | Andressen |
| 6,191,704 | B1 | 2/2001 | Takenaga et al. |
| 6,442,476 | B1 | 8/2002 | Poropat |
| 6,470,271 | B2 | 10/2002 | Matsunaga |
| 6,810,321 | B1 | 10/2004 | Cook |
| 6,844,924 | B2 | 1/2005 | Ruff et al. |
| 7,030,968 | B2 | 4/2006 | D'Aligny et al. |
| 7,036,639 | B2 | 5/2006 | Exely et al. |
| 7,076,365 | B2 | 7/2006 | Tzamaloukas |
| 7,176,830 | B2 | 2/2007 | Horibe |
| 7,248,342 | B1 | 7/2007 | Degnan |
| 7,266,447 | B2 | 9/2007 | Bauer et al. |
| 7,271,880 | B2 | 9/2007 | Samukawa et al. |
| 7,301,497 | B2 | 11/2007 | Roddy et al. |
| 7,969,558 | B2 | 6/2011 | Hall |
| 2002/0049530 | A1 | 4/2002 | Poropat |
| 2002/0060784 | A1 | 5/2002 | Pack et al. |
| 2002/0143506 | A1 | 10/2002 | D'Aligny et al. |
| 2002/0198632 | A1 | 12/2002 | Breed et al. |
| 2003/0069693 | A1 | 4/2003 | Snapp et al. |
| 2003/0112132 | A1 | 6/2003 | Trajkovic et al. |
| 2003/0140775 | A1 | 7/2003 | Stewart |
| 2003/0151541 | A1 * | 8/2003 | Oswald et al. ................... 342/70 |
| 2004/0119633 | A1 * | 6/2004 | Oswald et al. ................... 342/70 |
| 2005/0060069 | A1 | 3/2005 | Breed et al. |
| 2005/0134440 | A1 | 6/2005 | Breed |
| 2006/0197867 | A1 | 9/2006 | Johnson et al. |
| 2007/0018882 | A1 | 1/2007 | Manoogian et al. |
| 2007/0193798 | A1 | 8/2007 | Allard et al. |
| 2010/0106356 | A1 | 4/2010 | Trepagnier et al. |
| 2010/0256909 | A1 * | 10/2010 | Duggan et al. ................ 701/301 |
| 2011/0040427 | A1 | 2/2011 | Ben T-zvi |

OTHER PUBLICATIONS

Ruggero Frezza et al., "A Lagrangian Formulation of Nonholonomic Path Following", pp. 1-17, 1998.

Jeff Wit, "Autonomous Ground Vehicle Path Tracking" Journal of Robotic Systems 21(8), pp. 439-449 (2004).

Carl D. Crane III, et al., "Autonomous Ground Vehicle Technologies Applied to the DARPA Grand Challenge", ICCAS2004, Aug. 25-27, 2004, The Shangri-La Hotel, Bangkok, Thailand, pp. 1-5.

Thomas Berglund, "An Obstacle-Avoiding Minimum Variation B-Spline Problem", Department of Computer Science and Electrical Engineering, Department of Mathematics, Lulea University of Technology, pp. 1-6, 2003.

David Coombs et al, "Visualizing Terrain and Navigation Data", National Institute of Standards and Technology, Intelligent Systems Division, pp. 1-7, 2007.

Lee Gomes, "Portals: Amateur Team Defeats Experts in Computer-Car Race", Wednesday, Oct. 19, 2005, Wall Street Journal, Copyright © 1997-2004 PG Publishing Co., Inc.

Paul G. Trepagnier et al., "Team Gray Technical Paper DARPA Grand Challenge 2005", Aug. 28, 2005, pp. 1-13.

Xiaohong Bao, et al. LOD-Based Clustering Techniques for Efficient Large-Scale Terrain Storage and Visualization, In Proceedings SPIE Conference on Visualization and Data Analysis, pp. 225-235, 2003.

2005 DARPA Grand Challenge, From Wikipedia, the free encyclopedia, pp. 1-5.

Dennis Ryan, DCMILITARY.COM, "Cars, Not Drivers, Star at Pentagon Courtyard" pp. 1-4, Dec. 9, 2005.

Scientific American. Com., Innovations from a Robot Rally, Dec. 26, 2005, pp. 1-5.

Mark Helmlinger, Roadtrip America, "Winning Strategies at the DARPA Grand Challenge," DARPA Grand Challenge 2005, pp. 1-4.

Stefanie Olsen, URL:http://news.zdnet.com/2100-9584_22-5892115.html "Primm Valley, Nev.—In life, and apparently in artificial life, timing is everything", pp. 1-3, Oct. 2005.

Defense Industry Daily, "Drivers not Wanted: DARPA's Grand Challenge 2005 Winners", posted Oct. 11, 2005, pp. 1-6.

U.S. Department of Energy—Energy Efficiency and Renewable Energy EERE News, EERE Network News, Oct. 19, 2005, pp. 1-4.

School of Engineering, News:: Past Articles:: 2005, "Tulane Robo Car Among Finishers", pp. 1-2.

Humphrey Cheung, "Money Isn't Everything to Mastering the Grand Challenge", published Wednesday, Oct. 12, 2005, pp. 1-6.

Hongbo et al., "Terrain Matching Based on Imaging Laser Radar", ICSP'02 Proceeding, 2002.

U.S. Appl. No. 13/339,061, filed Dec. 28, 2011, Trepagnier, et al.

* cited by examiner

NAVIGATION AND CONTROL SYSTEM FOR AUTONOMOUS VEHICLES

CROSS REFERENCE TO RELATED APPLICATIONS

This application is a continuation of U.S. patent application Ser. No. 11/376,160, filed Mar. 16, 2006, the entire contents of which is incorporated herein by reference.

DISCUSSION OF THE BACKGROUND

1. Field of the Invention

The invention relates to a three-dimensional (3D) imaging sensor and method for controlling an autonomous vehicle.

2. Background of the Invention

In a modern vehicle, the driver remains a critical component of the vehicle's control system as the driver makes numerous decisions directed to the safe operation of the vehicle including speed, steering, obstacle and hazard recognition, and avoidance thereof. Yet, the driver's ability to perform all of these functions can become compromised due to physical factors such as driver fatigue, driver impairment, driver inattention, or other factors such as visibility that reduce the reaction time needed by the driver to successfully avoid hazards.

Furthermore, in environmentally dangerous surroundings such as for example in warfare settings or in settings where toxic or nuclear radiation hazards are present, the driver is at risk. Indeed, roadside bombs in Iraq are just one contemporary example of the loss of human life which could in many situations be avoided if supply trucks bringing materials to the troops were unmanned.

In other more conventional environments, the driver may become disoriented or incapable of physically commanding the vehicle as would occur if the driver suffered a medical emergency or if for example the driver became disoriented under the driving conditions. One example of such a disorienting or incapacitating environment would be a car or ship being driven or steered under snow, fog, rain, and/or nighttime blackout conditions where the diver (or captain of the ship) is handicapped in his or her ability to perceive and react to hazards approaching or to which the ship is approaching.

Thus, whether addressing human deficiencies in the control of a vehicle or whether in environmentally hazardous conditions where human control is not preferred, there exists a need to have a system and method for vehicular identification of objects in the path of the vehicle.

Numerous articles on the development of autonomously driven vehicles and laser detection and visualization systems have been reported such as the following reference articles all of which are incorporated herein by reference:

1) H. Wang, J. Kearney, J. Cremer, and P. Willemsen, "Steering Autonomous Driving Agents Through Intersections in Virtual Urban Environments," 2004 International Conference on Modeling, Simulation, and Visualization Methods, (2004);
2) R. Frezza, G. Picci, and S. Soatto, "A Lagrangian Formulation of Nonholonomic Path Following," The Confluence of Vision and Control, (A. S. Morse et al. (eds), Springer Verlag, 1998);
3) J. Shirazi, Java Performance Tuning, (OReilly & Associates, 2000);
4) J. Witt, C. Crane III, and D. Armstrong, "Autonomous Ground Vehicle Path Tracking," Journal of Robotic Systems, (21(8), 2004);
5) C. Crane III, D. Armstrong Jr., M. Torrie, and S. Gray, "Autonomous Ground Vehicle Technologies Applied to the DARPA Grand Challenge," International Conference on Control, Automation, and Systems, (2004);
6) T. Berglund, H. Jonsson, and I. Soderkvist, "An Obstacle-Avoiding Minimum Variation B-spline Problem," International Conference on Geometric Modeling and Graphics, (July, 2003);
7) D. Coombs, B. Yoshimi, T. Tsai, and E. Kent, 'Visualizing Terrain and Navigation Data," NISTIR 6720, (Mar. 1, 2001);
8) U.S. Pat. No. 5,644,386 to Jenkins et al;
9) U.S. Pat. No. 5,870,181 to Andressen;
10) U.S. Pat. No. 5,200,606 to Krasutsky et al; and
11) U.S. Pat. No. 6,844,924 to Ruff et al;

Despite this work, realization of suitable visualization, obstacle identification, and obstacle avoidance systems and methods has not been without problems limiting the operation of vehicles.

SUMMARY OF THE INVENTION

Accordingly, one object of the present invention accomplished in various of the embodiments is to provide a system and method for vehicle object identification in which a location of the object relative to the vehicle is identified.

Another object of the present invention accomplished in various of the embodiments is to provide a system and method for vehicle object identification in which a path for the vehicle relative to the location of the object is identified.

Yet another object of the present invention accomplished in various of the embodiments is to provide a system and method for identifying objects in a field of view of the vehicle as obstacles.

Still another object of the present invention accomplished in various of the embodiments is to provide steering and vehicle control directions to avoid the obstacles Various of these and other objects are provided for in certain ones of the embodiments of the present invention.

In one embodiment of the present invention, a navigation and control system includes a sensor configured to locate objects in a predetermined field of view from a vehicle. The sensor has an emitter configured to repeatedly scan a beam into a two-dimensional sector of a plane defined with respect to a first predetermined axis of the vehicle, and a detector configured to detect a reflection of the emitted beam from one of the objects. The sensor includes a panning mechanism configured to pan the plane in which the beam is scanned about a second predetermined axis to produce a three dimensional field of view. The navigation and control system includes a processor configured to determine the existence and location of the objects in the three dimensional field of view based on a position of the vehicle and a time between an emittance of the beam and a reception of the reflection of the emitted beam from one of the objects.

In one embodiment of the present invention, a method for navigation and control of a vehicle includes scanning a beam into a sector of a plane defined with respect to a first predetermined axis of the vehicle, detecting a reflection of the emitted beam from an object removed from the vehicle, panning the plane in which the beam is scanned about a second predetermined axis to produce a three dimensional field of view, and determining the existence and location of the object in the three dimensional field of view based on a position of the vehicle and a time between an emittance of the beam and a reception of the reflection of the emitted beam.

It is to be understood that both the foregoing general description of the invention and the following detailed description are exemplary, but are not restrictive of the invention.

BRIEF DESCRIPTION OF THE DRAWINGS

A more complete appreciation of the present invention and many attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
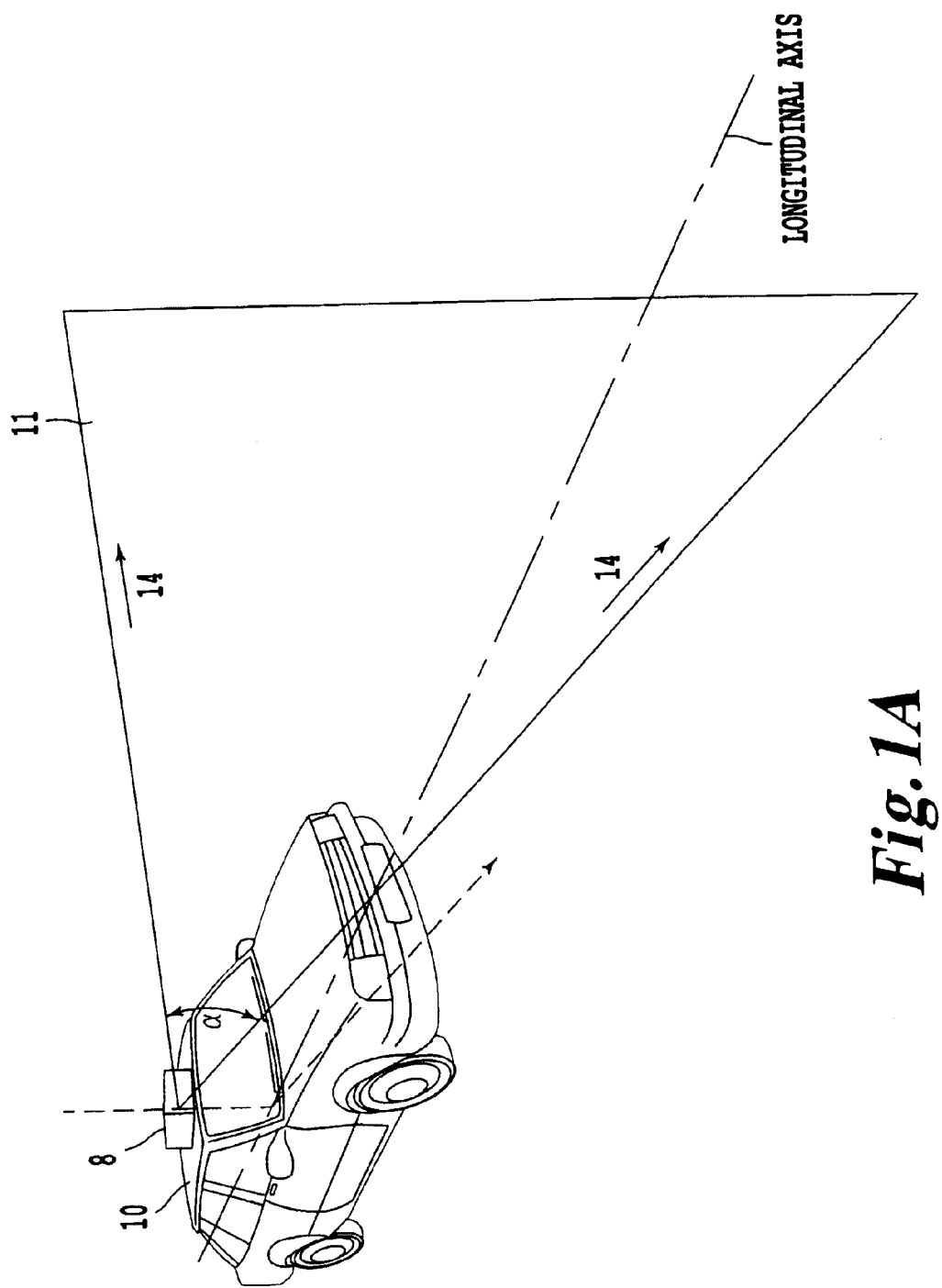
FIG. 1A is a schematic illustration of an autonomous vehicle according to one embodiment of the present invention in which a two-dimensional (2D) scan is made in a sector of a plane normal to a predetermined axis of a vehicle.
Figure 1B:
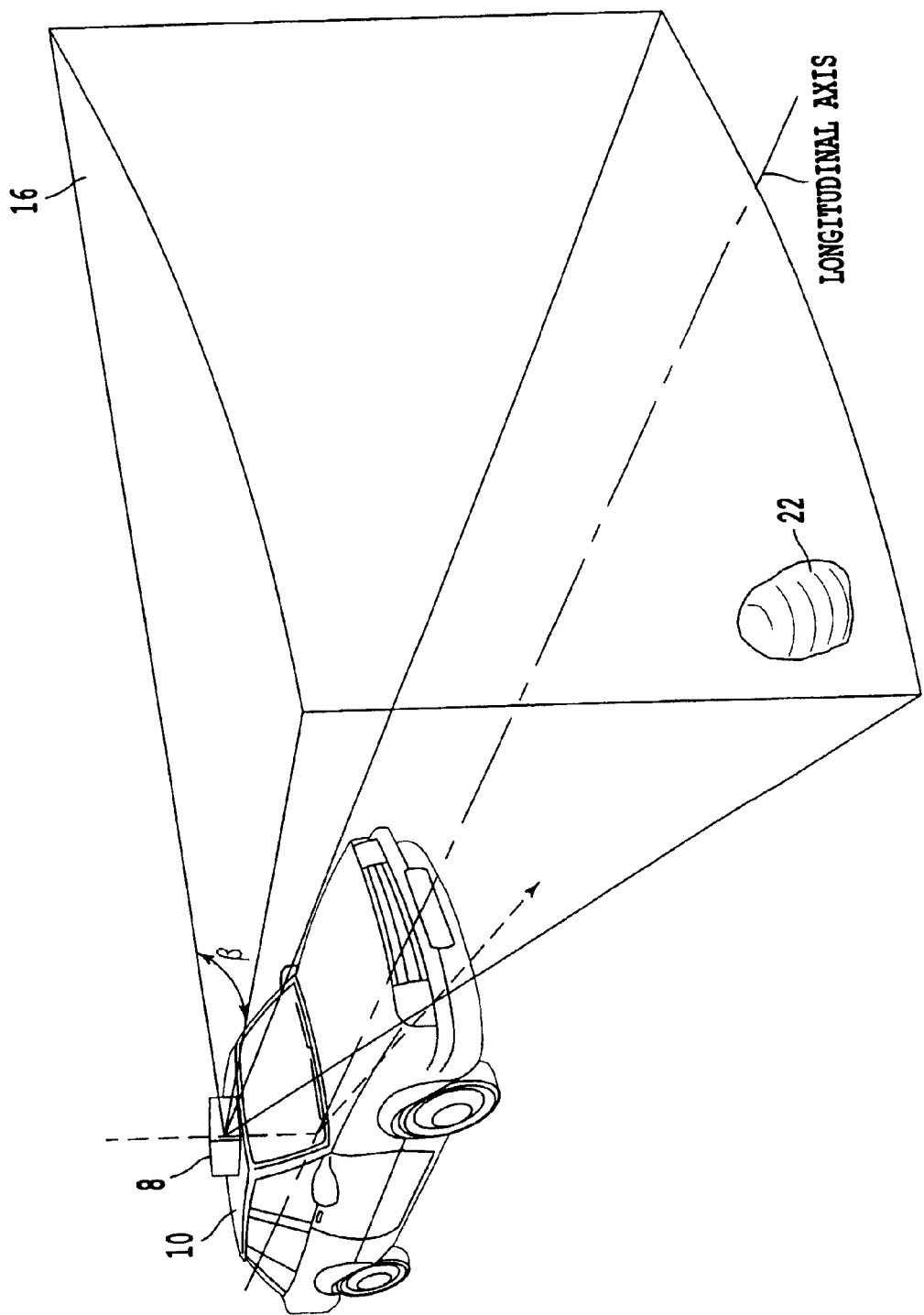
FIG. 1B is a schematic illustration of an autonomous vehicle according to one embodiment of the present invention in which a three-dimensional (3D) scan is made by displacing the scan out the plane normal to the predetermined axis of a vehicle.
Figure 2:
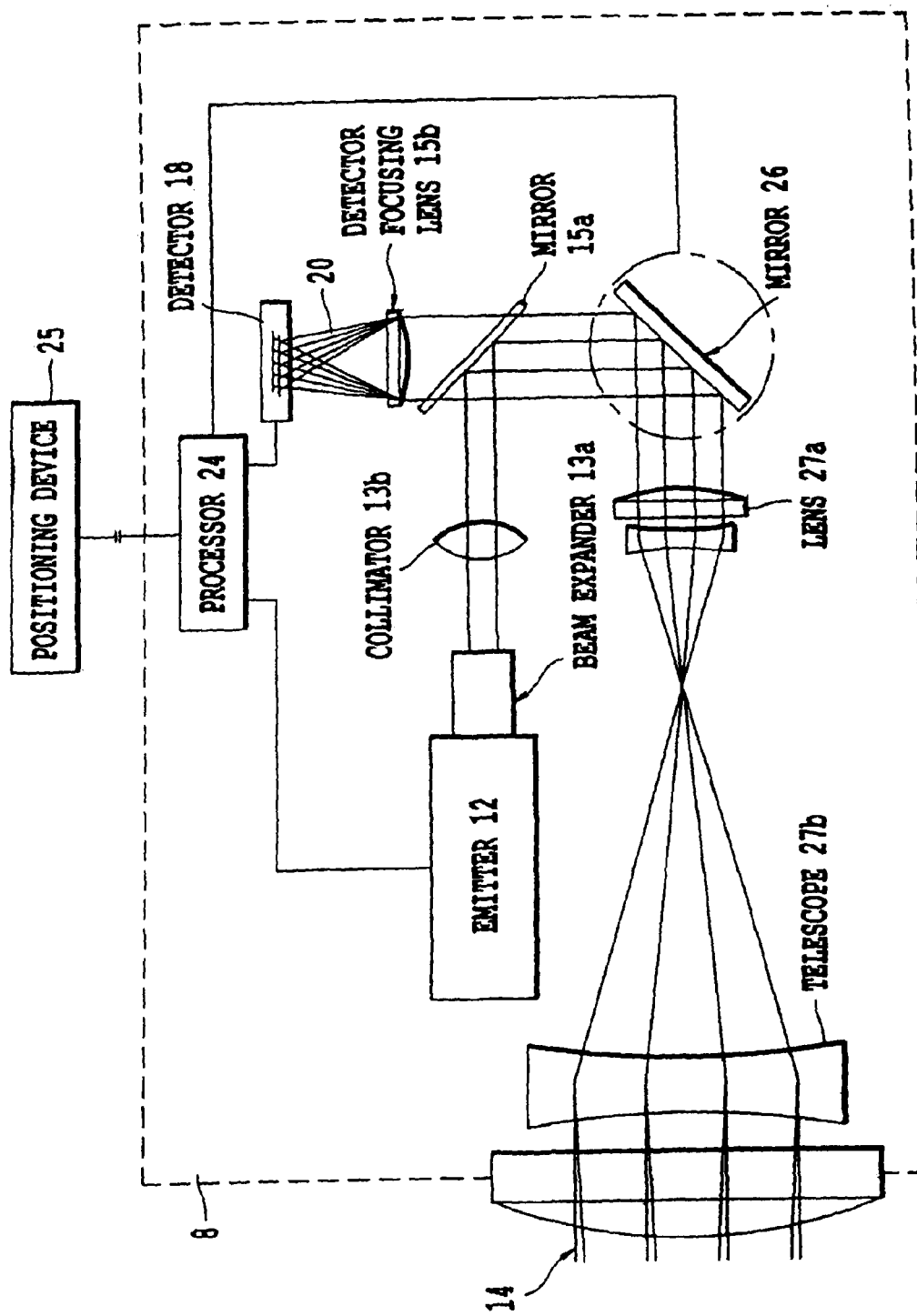
FIG. 2 is a schematic illustration of an emitter and detector system according to one embodiment of the present invention.

Referring now to the drawings, wherein like reference numerals designate identical, or corresponding parts throughout the several views, and more particularly to FIG. 1A, which depicts an imaging sensor 8 mounted, in one embodiment, on top of a vehicle 10 in which a two-dimensional (2D) scan is made in a sector of a plane 11 normal to a predetermined axis of the vehicle 10 referred to here for illustration purposes as a "vertical" scanning plane. The imaging sensor 8 includes in one embodiment an emitter 12 (as shown in FIG. 2) that transmits laser pulses (or light) 14 from the imaging sensor 8 into the environment about the vehicle 10. As shown in FIG. 1A, the laser (or light) pulses 14 are emitted into the vertical scanning plane 11. To produce a three-dimensional (3D) image, the imaging sensor 8 is panned (or oscillated) in and out of plane 11 to create a 3D scanning volume 16, as shown in FIG. 1B. The imaging sensor 8 detects objects 22 (as shown in FIG. 1B) in the environment nearby the vehicle 10 by detecting light reflected from the objects 22.

As shown in FIG. 2, the imaging sensor 8 includes a detector 18 for detecting return of an echoed signal 20. The imaging sensor 8 utilizes a processor 24 for controlling the timing and emission of the laser pulses 14 and for correlating emission of the laser pulses 14 with reception of the echoed signal 20. The processor 24 may be on-board the vehicle or a part of the imaging sensor 8. Details of exemplary processors and their functions are provided later.

In an exemplary example, laser pulses 14 from emitter 12 pass through a beam expander 13a and a collimator 13b. The laser pulses 14 are reflected at a stationary mirror 15a to a rotating mirror 26 and then forwarded through lens 27a and a telescope 27b to form a beam for the laser pulses 14 with a diameter of 1-10 mm, providing a corresponding resolution for the synthesized three-dimensional field of view. The telescope 27b serves to collect light reflected from objects 22.

In one embodiment of the present invention, the detector 18 is configured to detect light only of a wavelength of the emitted light in order to discriminate the laser light reflected from the object back to the detector from background light. Accordingly, the imaging sensor 8 operates, in one embodiment of the present invention, by sending out a laser pulse 14 that is reflected by an object 22 and measured by the detector 18 provided the object is within range of the sensitivity of the detector 18. The elapsed time between emission and reception of the laser pulse permits the processor 24 is used to calculate the distance between the object 22 and the detector 18. In one embodiment of the present invention, the optics (i.e., 13a, 13b, 15a, 26, 27a, and 27b) are configured to direct the beam instantaneously into the sector shown in FIG. 1A, and the detector 18 is a field-programmable gate array for reception of the received signals at predetermined angular positions corresponding to a respective angular direction $\alpha_1$ shown in FIG. 1A.

Via the rotating mirror 26, laser pulses 14 are swept through a radial sector a within plane 11, as shown illustratively in FIG. 1A. In one embodiment of the present invention, in order to accomplish mapping of objects in the field of view in front of the imaging sensor 8, the rotating mirror 26 is rotated across an angular displacement ranging from 30 to 90 degrees, at angular speeds ranging from 100-10000 degrees per second. For example, a 90 degree scanning range can be scanned 75 times per second or an 80 degree scanning range can be scanned between 5 and 100 times per second. Furthermore, the angular resolution can be dynamically adjusted (e.g., providing on command angular resolutions of 0.01, 0.5, 0.75, or 1 degrees for different commercially available sensors 8.

Commercially available components can be used for the emitter 12 and the detector 18 to provide ranging measurements. In one embodiment, the emitter 12, the detector 18, and the associated optics constitute a laser radar (LADAR) system, but other systems capable of making precise distance measurements can be used in the present invention, such as for example a light detection and ranging (LIDAR) sensor, a radar, or a camera. LIDAR (Light Detection and Ranging; or Laser Imaging Detection and Ranging) is a technology that determines distance to an object or surface using laser pulses. Like the similar radar technology, which uses radio waves instead of light, the range to an object is determined by measuring the time delay between transmission of a pulse and detection of the reflected signal. LADAR (Laser Detection and Ranging) refers to elastic backscatter LIDAR systems. The term laser radar is also in use, but with laser radar laser light (and not radio waves) are used.

The primary difference between LIDAR and radar is that with LIDAR, much shorter wavelengths of the electromagnetic spectrum are used, typically in the ultraviolet, visible, or near infrared. In general it is possible to image a feature or object only about the same size as the wavelength, or larger. Thus, LIDAR provides more accurate mapping than radar systems. Moreover, an object needs to produce a dielectric discontinuity in order to reflect the transmitted wave. At radar (microwave or radio) frequencies, a metallic object produces a significant reflection. However non-metallic objects, such as rain and rocks produce weaker reflections, and some materials may produce no detectable reflection at all, meaning some objects or features are effectively invisible at radar frequencies. Lasers provide one solution to these problems. The beam densities and coherency are excellent. Moreover the wavelengths are much smaller than can be achieved with radio systems, and range from about 10 micrometers to the UV (e.g., 250 nm). At these wavelengths, a LIDAR system can offer much higher resolution than radar.

To produce a three-dimensional (3D) image, in one embodiment of the present invention, the imaging sensor 8 is panned (or oscillated) in and out the plane 11 to create a 3D scanning volume 16, as shown in FIG. 1B. For sake of illustration, FIG. 1B defines the scanning volume 16 by the angle $\alpha$ (in the vertical scanning direction) and the angle $\beta$ (in the horizontal scanning direction). The angle $\alpha$, as noted earlier, ranges from 30 to 70 degrees, at angular speeds ranging from 100-1000 degrees per second. The angle $\beta$ (i.e., the panning angle) ranges from 1 to 270 degrees, at a panning rate ranging from 1-150 degrees per second. Combined the imaging sensor 8 typically can completely scan the 3D scanning volume 16 at more than two times a second.

In order to accurately determine the distance to objects in the 3D scanning volume 16, the direction that the imaging sensor 8 is pointed at the time of receiving light reflected from the objects 22 is needed (i.e., the angle of deflection from plane 28 is needed). Further, in one embodiment of the present invention, geospatial positional data of the instantaneous vehicle position is utilized by processor 24 to calculate based on the distance of the object from the vehicle and its direction from the vehicle, the geospatial location of the objects in the field of view. In one configuration of the present invention, the processor 24 includes a personal computer running on a Linux operating system, and the algorithms are programmed in Java programming language. Other computing systems and programming languages can be used in the present invention (as discussed in more detail below). As shown in FIG. 2, processor 24 is in communication with a real time positioning device 25, such as for example a global positioning system (GPS) and/or an inertial navigation system (INS), that transmits the location, heading, altitude, and speed of the vehicle multiple times per second to processor 24. The real time positioning device 25 is typically mounted to the vehicle 10 and transmits data (such as location, heading, altitude, and speed of the vehicle) to all imaging sensors 8 (and all processors 24) on the vehicle 10.

With commercially available GPS and the INS units, processor 24 can determine a position of an object in the field of view to an accuracy of better than 10 cm. In one embodiment of the present invention, the processor 24 correlates GPS position, LADAR measurements, and angle of deflection data to produce a map of obstacles in a path of the vehicle. The accuracy of the map depends on the accuracy of the data from the positioning device 25. The following are illustrative examples of the accuracies of such data: position 10 cm, forward velocity 0.07 km/hr, acceleration 0.01%, roll/pitch 0.03 degrees, heading 0.1 degrees, lateral velocity 0.2%.

In one embodiment of the present invention, a Kalman filter (commercially integrated) sorts through all data inputs to processor 24. A Kalman filter is a known method of estimating the state of a system based upon recursive measurement of noisy data. In this instance, the Kalman filter is able to much more accurately estimate vehicle position by taking into account the type of noise inherent in each type of sensor and then constructing an optimal estimate of the actual position. Such filtering is described by A. Kelly, in "A 3d State Space Formulation of a Navigation Kalman Filter for Autonomous Vehicles," CMU Robotics Institute, Tech. Rep., 1994, the entire contents of which are incorporated herein by reference. The Kalman filter is a set of mathematical equations that provides an efficient computational (recursive) means to estimate the state of a process, in a way that minimizes the mean of the squared error. The filter is very powerful in several aspects: it supports estimations of past, present, and even future states, and it can do so even when the precise nature of the modeled system is unknown.

The positioning device 25, by including GPS and INS data, provide complementary data to the processor 24. GPS and INS have reciprocal errors. That is GPS is noisy with finite drift, while INS is not noisy but has infinite drift. Further, the processor 24 can be configured to accept additional inputs (discussed below) to reduce drift in its estimate of vehicle position when, for example the GPS data may not be available.

Figure 3:
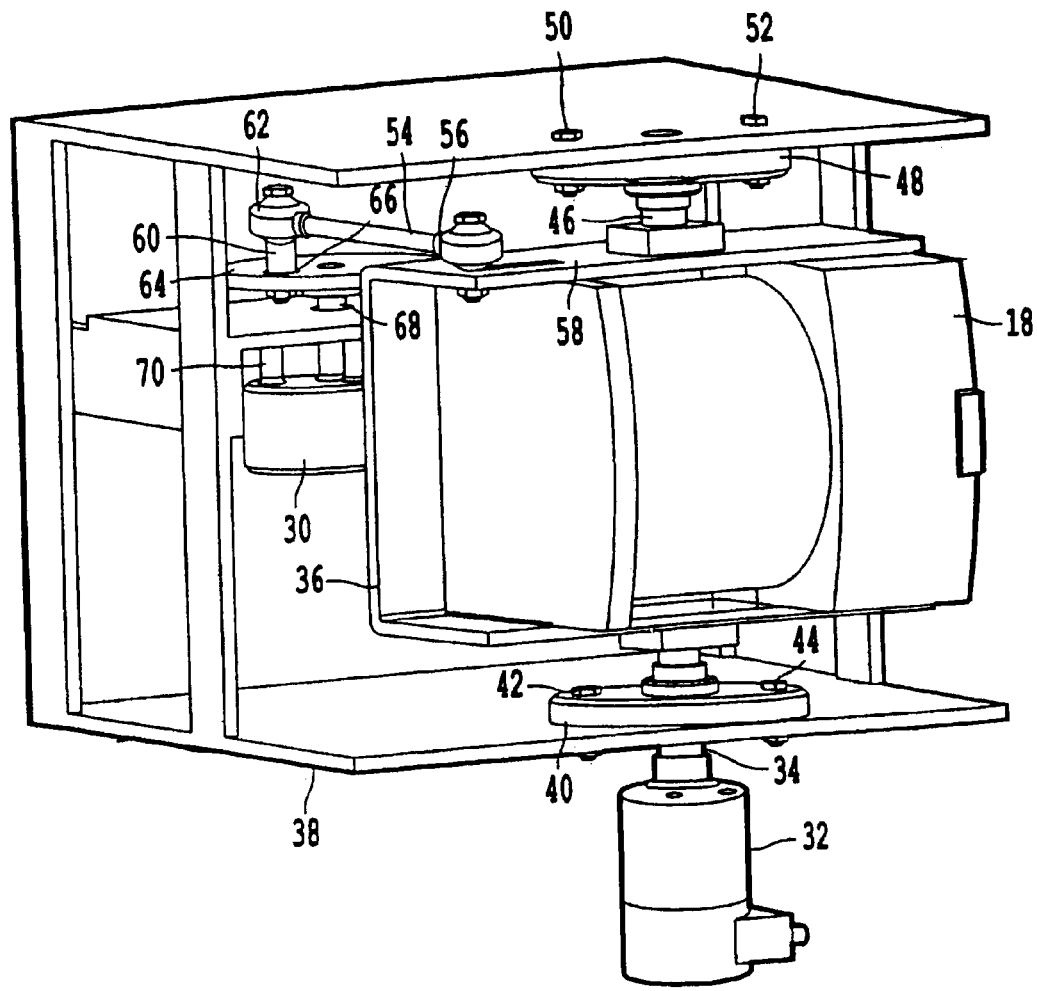
FIG. 3 is a detailed schematic illustration showing a perspective frontal view of a laser radar (LADAR) imaging sensor according to one embodiment of the present invention.
Figure 4:
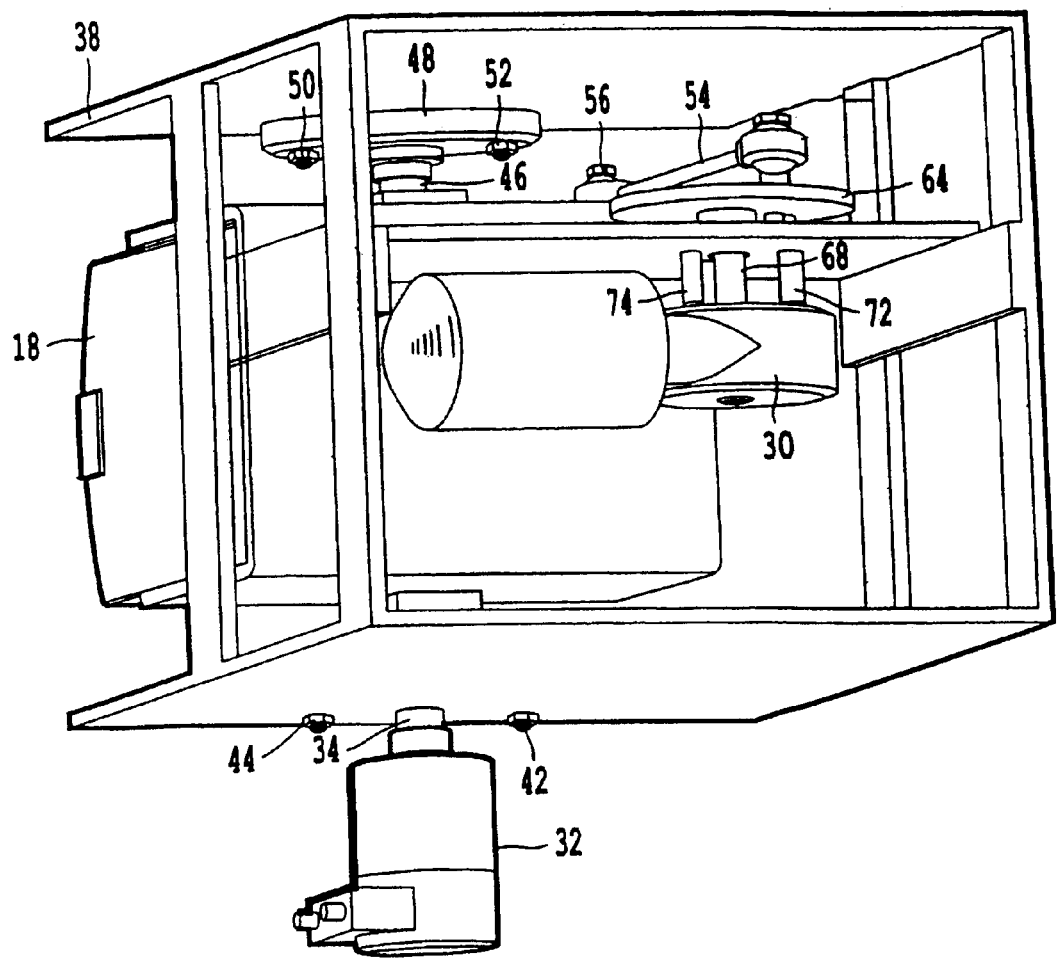
FIG. 4 is a detailed schematic illustration showing a perspective rear view of the laser radar (LADAR) imaging sensor depicted in FIG. 3.

FIG. 3 is a detailed schematic illustration of imaging sensor 8 of the present invention. FIG. 3 presents a frontal view of imaging sensor 8. FIG. 4 presents a rear perspective view of imaging sensor 8. FIG. 3 shows a motor 30 configured to oscillate the imaging sensor 8 in and out of a plane normal to a predetermined axis of the imaging sensor. In one embodiment of the present invention, a 12-volt DC motor operating at a speed of 120 RPM is used to oscillate the imaging sensor 8 in and out the plane. Other motors with reciprocating speeds different than 120 RPM can be used.

As shown in FIG. 3, an absolute rotary encoder 32 is placed on a shaft 34 that is oscillating. The encoder 32 provides an accurate reading of the angle at which the shaft 34 is instantaneously located. By the encoder 32, an accurate measurement of the direction that the imaging sensor 8 is pointed, at the time of the scan, is known. In one embodiment of the present invention, the encoder 32 is an ethernet optical encoder (commercially available from Fraba Posital), placed on shaft 34 to provide both the angular position and angular velocity of the shaft.

To decrease the delay between reading a value from the sensor and reading a value from the encoder, a separate 100 MBit ethernet connection with its own dedicated ethernet card connected the processor 24 with the encoder. This created communications delays between the encoder and the I/O computer that were consistent at approximately 0.5 ms. Testing revealed that an actual LADAR scan was taken approximately 12.5 ms before the data was available at the I/O computer. When this time was added to the 0.5 ms of delay from the encoder communications, a 13 ms delay from the actual scan to the actual reading of the encoder position and velocity was present. To counteract the angular offset this delay created, in one embodiment of the present invention, the velocity of the encoder is multiplied times the communications delay of 0.013 seconds to calculate the angular offset due to the delay. This angular offset (which was either negative or positive depending on the direction of oscillation) was then added to the encoder's position, giving the actual angle at the time when the scan occurred. This processing permits the orientation of the LADAR platform to be accurate within 0.05 degrees.

Further, as shown in FIGS. 3 and 4, the metal shaft 34 is attached to a detector bracket 36 which is supported by a metal casing 38 with bearing 40. Bearing 40 is attached to metal casing 38 with a fastening mechanism such as bolts 42 and 44. Detector bracket 36 is attached to metal shaft 34. Further, as shown in FIGS. 3 and 4, metal shaft 46 is attached to bearing 48. Bearing 48 is attached to metal casing 38 with a fastening mechanism such as bolts 50 and 52. Push rod 54 is attached to detector bracket 36 with ball joint 56 on slot 58. Push rod 54 is attached to pivot spacer 60 with ball joint 62. Pivot spacer 60 is attached to servo arm 64 on slot 66. Servo arm 64 is attached to metal shaft 68. Motor 30 is attached to servo arm 64 and is suspended from metal casing 38 by motor mounts 70, 72, and 74.

The imaging sensor 8 operates, in one embodiment, by oscillating a measurement sensor laterally about an axis of the vehicle 10, as shown in FIG. 1A. In the one embodiment, the shaft 68 of motor 30 rotates at a constant speed, causing servo arm 64 to also spin at a constant speed. One end of push rod 54 moves with servo arm 64, causing detector bracket 36 to oscillate back and forth. The degree of rotation can be adjusted by moving the mount point of ball joint 56 along slot 58, and/or the mount point of ball joint 62 along slot 66. Moving the mount point closer to shaft 46 increases the angle of rotation, while moving the mount point away from shaft 46 decreases the angle of rotation.

While sensor 18 is oscillating, the sensor 18 is taking measurements of the surrounding environment along the vertical scanning plane, as shown in FIG. 1A. The absolute rotary encoder 32 operates as an angular position mechanism, and transmits the absolute angle of deflection of detector bracket 36 to processor 24. At the same time, a real time positioning device 76, such as a global positioning system (GPS) or an inertial navigation system (INS), transmits the location, heading, altitude, and speed of the vehicle multiple times per second to processor 24. Software running on the processor 24 integrates the data, and, in one embodiment, uses matrix transformations to transform the YZ measurements from each 2D scan (as shown in FIG. 1) into a 3D view of the surrounding environment. Due to the use of the real time positioning device, in the present invention, a terrain map can be calculated even while the vehicle is moving at speeds in excess of 45 miles per hour.

Obstacle Detection Algorithms

The imaging sensor 8 is configured, in one embodiment of the present invention, to receive data in the processor regarding echoed or returned signals, GPS position, LADAR measurements, and angle of deflection data to determine what sectors of the 3D scan contain obstacles, and therefore to determine which sectors are most likely impassable by the vehicle. In one embodiment of the present invention, data coming from detector 18 is formatted in a coordinate system relative to the detector 18, as detailed in the exemplary illustrations below.

Since the imaging sensor 8 is in a "vertical" configuration, the coordinate system in that configuration has Y-axis representing a distance from the sensor roughly parallel with the forward direction of the vehicle, with the X-axis lined up along the vertical direction. Hence, in one embodiment of the present invention, a search for obstacles is manifest in the slope and extent in the X-axis. To facilitate this search, all measurement points in the detector's scan are sorted by the Y-values (i.e., by a distance from the detector 18).

Figure 5:
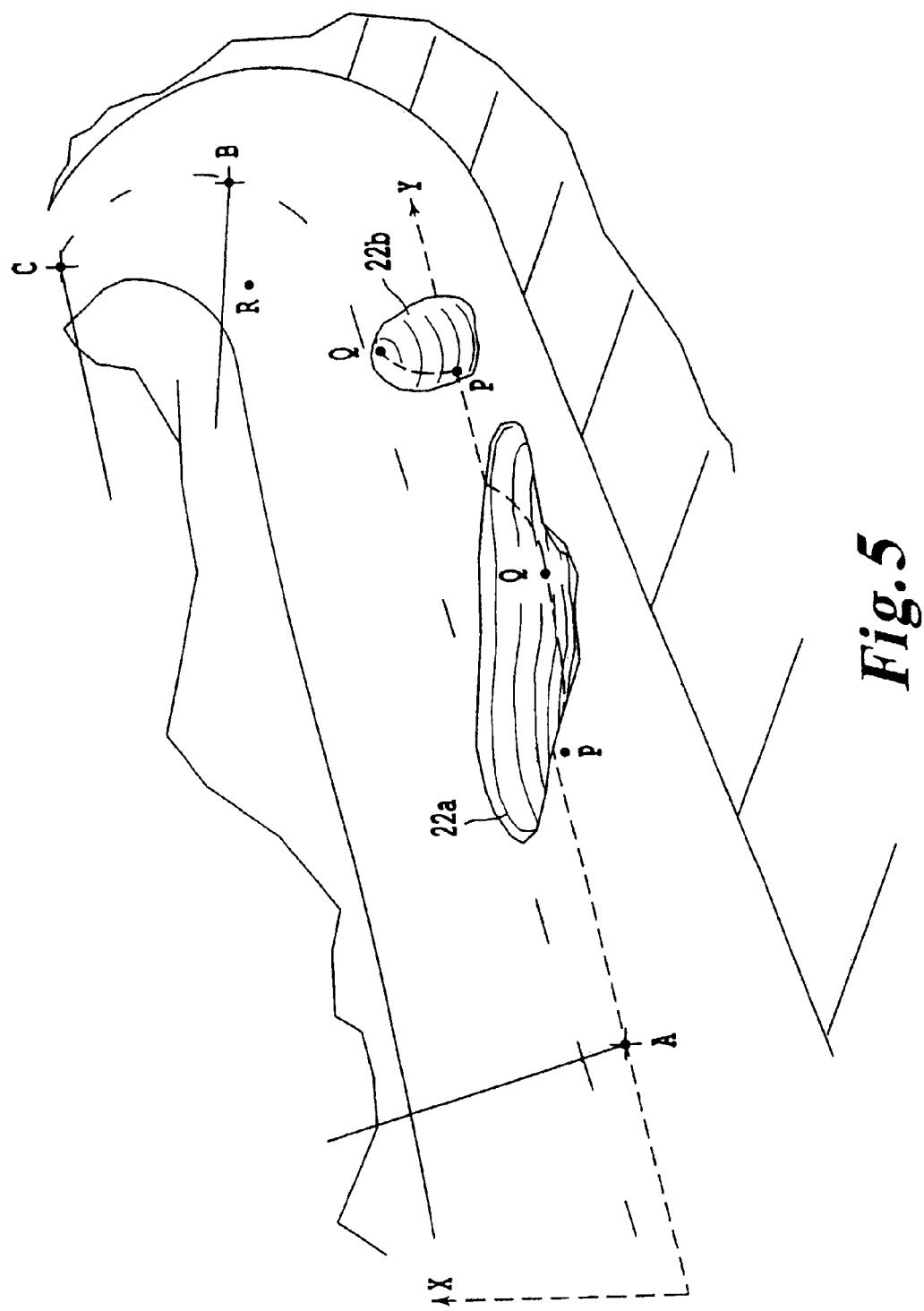
FIG. 5 is a contour map of a 3D scan obtained by methods of the present invention.

FIG. 5 is a schematic representation of a contour map showing the reflected signatures from an object in a synthesized field of view. FIG. 5 depicts two common obstacles that the vehicle 10 needs to avoid. Obstacle 22a is a depression in the highway (e.g., a pothole). Obstacle 22b is an obstruction in the highway (e.g., a fallen boulder). As shown in FIG. 5, lines of constant elevation have been added to the drawing in FIG. 5 for clarity. The imaging sensor 8 of the present invention, as shown in FIG. 1A, produces a vertical scan, which in FIG. 5 is shown depicted on an X-Y axis. A vertical scan provides the advantage of directly supplying slope data (i.e., $\Delta X/\Delta Y$ data) along the road and obstacles shown in FIG. 5 without having to complete a full 3D scan, as shown in FIG. 1B, and then process the image map for slope data. Furthermore, in data from a vertical scan plane as in FIG. 1A, obstacles appear as either clusters of similar distance or gaps in distance, making obstacle identification more discernable in the data.

According to one embodiment of the present invention, any point P is classified as part of an obstacle if and only if there could be found a point Q such that Equations (1), (2), and (3) are satisfied (where $h_{max}$ is the maximum height or depth, $m_{max}$ is the maximum slope, $\hat{i}$ is the unit vector in the X direction, and $\hat{j}$ is the unit vector in the Y direction).

$$Q \cdot \hat{j} > P \cdot \hat{j} \tag{1}$$

$$\left| \frac{Q \cdot \hat{i} - P \cdot \hat{i}}{Q \cdot \hat{j} - P \cdot \hat{j}} \right| > m_{max} \tag{2}$$

$$|Q \cdot \hat{i} - P \cdot \hat{i}| > h_{max} \tag{3}$$

Equation (1) represents a condition in which there exists a first point Q in the field of view that is farther away from the vehicle than a second point P. Equation (2) represents a condition in which a slope between the first point and the second point is greater than a predetermined slope. Equation (3) represents a condition in which a height between the first point and the second point is greater than a predetermined height.

Once an obstacle is found relative to the sensor, its location must be translated into the global reference frame (i.e., a geospatial reference frame). This can be accomplished in two similar steps. In each step, a transformation matrix is defined so that $$P_2 = T_{1 \rightarrow 2} P_1 + \Delta_1 \tag{4}$$

where $T_{1 \rightarrow 2}$ is the transformation matrix for going from coordinate frame 1 to coordinate frame 2, $\Delta_1$ is the vector representing the position of the coordinate frame 1 with respect to coordinate frame 2, and $P_1$ and $P_2$ are the same point in coordinate frames 1 and 2, respectively.

The first step converts from the detector coordinate frame to the vehicle's coordinate frame. The transformation matrix, $T_{s \rightarrow v}$, is defined as $$T_{s \rightarrow v} = \begin{bmatrix} \cos\psi_s & -\sin\psi_s & 0 \\ \sin\psi_s & \cos\psi_s & 0 \\ 0 & 0 & 1 \end{bmatrix} \begin{bmatrix} \cos\theta_s & 0 & \sin\theta_s \\ 0 & 1 & 0 \\ -\sin\theta_s & 0 & \cos\theta_s \end{bmatrix} \begin{bmatrix} 1 & 0 & 0 \\ 0 & \cos\phi_s & -\sin\phi_s \\ 0 & \sin\phi_s & \cos\phi_s \end{bmatrix} \tag{5}$$

where $\psi_s$, $\theta_s$ and $\phi_s$ are the yaw (around the z-axis), pitch (around the y-axis), and roll (around the x-axis) of the detector coordinate frame relative to the vehicle's coordinate frame. This transformation takes into account deviations in yaw, pitch, or roll caused by the mounting of the sensor. For example, if the detector were mounted pointed slightly downward, it would have a negative pitch that would need to be countered by setting $\theta_s$ to its inverse (or positive) value. In addition, the angle of deflection caused by the oscillation is processed here by adding it to $\theta_s$.

In one embodiment of the present invention, the same basic transformation and translation is performed again in order to translate the obstacle's location from the vehicle's coordinate system to a global system. Yet another transformation matrix, $T_{v \to g}$, is constructed for this purpose.

$$T_{v \to g} = \begin{bmatrix} \cos\psi_v & -\sin\psi_v & 0 \\ \sin\psi_v & \cos\psi_v & 0 \\ 0 & 0 & 1 \end{bmatrix} \begin{bmatrix} \cos\theta_v & 0 & \sin\theta_v \\ 0 & 1 & 0 \\ -\sin\theta_v & 0 & \cos\theta_v \end{bmatrix} \begin{bmatrix} 1 & 0 & 0 \\ 0 & \cos\phi_v & -\sin\phi_v \\ 0 & \sin\phi_v & \cos\phi_v \end{bmatrix} \quad (6)$$

where $\psi_v$, $\theta_v$, and $\phi_v$ are the heading (around the z-axis), pitch (around the y-axis), and roll (around the x-axis) of the vehicle relative to the global coordinate frame. These heading, pitch, and roll values are generated by the GPS/INS navigation sensor that is mounted on the vehicle.

After taking into account both of these transformation matrices, the full equation for transformation from detector frame to the global coordinate frame is:

$$P_g = T_{v \to g}(T_{s \to v} P_s + \Delta_s) + \Delta_v. \quad (7)$$

where $\Delta_s$ is the vector representing the position of the sensor with respect to the center of the vehicle and $\Delta_v$ is the vector representing the position of the center of the vehicle with respect to the center of the GPS/INS navigation sensor.

At this point, in one embodiment of the present invention, the geospatial locations of all obstacles in the LADAR sensor's current scan are known. Each of these obstacles is now checked to determine if it can be safely ignored. If an obstacle is far enough away, it can safely be ignored for the time being. FIG. 5 shows for the purposes of illustration a point R beyond the obstacles 22a and 22b. In some situations, data regarding the positioning of objects (or other obstacles) beyond this distance can be discarded for example until the vehicle has safely navigated the obstacles 22a and 22b. The distance to the point R will also depend on the speed of the vehicle and the accuracy of the detector 18 to see objects beyond a sensitivity of the detector 18. Discarding object data serves two purposes. One, the further away an object is from the LADAR unit, the higher the chance that it is a false signature. False signatures could cause the autonomous vehicle to be unable to find a path, so they must be avoided at all costs. Two, by reducing the number of obstacles that must be processed at any given time, less computing resources are needed. The remaining obstacles are now processed to determine if the vehicle's current path will collide with any of these obstacles. If any of these obstacles will cause a collision, the path is shifted to avoid the obstacles (as will be discussed later).

Associated with the distance criteria, the processor 24 in one embodiment of the present invention discards objects in the field of view of the detector 18 that are beyond a travel-point distance. The travel-point distance (also exemplified by point R on FIG. 5) is in one embodiment the calculated distance that is an arbitrary factor (e.g., factors of 5, 10, 100) multiplied times the distance that the vehicle will travel at the current speed before the next complete 3D scan of angular sector 16 is made. The travel-point distance is in one embodiment set to an arbitrary distance (e.g., 100 m). The travel-point distance in different embodiments of the present invention can be calculated based on linear, sigmoid, or exponential functions that are evaluated using values such as vehicle speed and time and path. By discarding objects in the field of view beyond the travel-point distance, the processor will not be required to process data associated with objects so far removed from the vehicle that determination of whether or not the objects are obstacles to the path of the vehicle will make no difference in the steering of the vehicle.

Accordingly, in one embodiment of the present invention, every vertical scan produces from the slope and height data a set of obstacles that meet the vector criteria defined in eqns. (1)-(3). Since the vertical scan represents a very small slice of the 3D viewing field, the location of the obstacle can be represented by a polygon represented in this illustrative example by a series of spatial coordinate points including a center point and four corner points: 0.2 m from the back of center, 0.2 m from front of center, 0.2 m from left of center, and 0.2 m from right of center. In one embodiment of the present invention, spatial indices such as a quadtree stores the polygon and efficiently subdivides space, so that object retrieval (such as identifying if an obstacle exists within a space) is faster than having to search a plot map containing obstacles on a point-by-point analysis. Fitch et al., U.S. Pat. No. 6,212,392, the entire contents of which are incorporated herein by reference, describe the use of quadrees to determine whether or not a location associated with a wireless station is within an area of interest. Bao et al., "LOD-based Clustering Techniques for Efficient Large-scale Terrain Storage and Visualization," in Proceedings SPIE Conference on Visualization and Data Analysis, pages 225-235 (2003), the entire contents of which are incorporated herein by reference, describe memory algorithms suitable for the present invention in which clustering algorithms and data structures including hierarchical quadree triangulation are explained in detail.

In one embodiment of the present invention, a navigation and control system includes a sensor (e.g., imaging sensor 8) configured to locate objects in a field of view from a vehicle (e.g., vehicle 10) and a processor (e.g., processor 24) configured to determine the existence and location of the objects in the field of view based on a position of the vehicle and a time between an emittance of a beam from the sensor and a reception of a reflection of the emitted beam from one of the objects. In this embodiment, the processor includes a memory including storage elements corresponding to subsectors in the field of view. The processor is configured 1) to perform an obstacle identification algorithm to determine if any object is an obstacle, 2) to determine in which of the field of view subsectors a determined obstacle exists, and 3) to store in each corresponding memory element an obstacle indicator indicative that an obstacle exists in the corresponding subsector. In one embodiment of the present invention, processor 24 is configured to determine if a projected path of the vehicle intersects any subsector storing an indicator. In one embodiment of the present invention, processor 24 is configured to execute an obstacle identification algorithm including: determining first and second points on a contour map of an object, determining if the first point is farther away from the vehicle than the second point, determining a slope between the first point and the second point, determining if the slope is greater than a predetermined slope, and determining if a height between the first point and the second point is greater than a predetermined height, and if so, determining the object is an obstacle.

A path planning algorithm (to be discussed in more detail later) according to one embodiment of the present invention presents a "query" polygon for a sector in front of the vehicle and determines from the spatial index (e.g., a quadtree) if any of the stored obstacle polygons intersect the "query" polygon. If so, a path around the query polygon is chosen. If not, the path is clear of obstacles. The way that a quadtree (or most spatial indices) eliminates sectors of space is by keeping track of where it has inserted obstacles. For the quadtree techniques used in one embodiment of the present invention, the quadtree subdivides space as obstacles are inserted, thereby creating an indicator that this sector of space contains an obstacle. This leaves many sectors that are empty of obstacles, and the quadtree knows that these sectors are empty. Therefore, if the query is within one of these sectors, it cannot have an obstacle collision.

One conventional way to determine the number of obstacles in the path of the vehicle is to mount stationary LADAR units pointed at the ground. With these LADAR units being pointed at the ground, the angle at which the LADAR beam hits the ground is calculated. Based on this angle, simple trigonometry can determine where the object is located relative to the car. In most conventional cases, multiple stationary LADAR units are used and each is placed at a different known angle.

There are several disadvantages to the conventional approach:

1) The conventional approach requires movement from the autonomous vehicle in order to map the environment. This means that while the vehicle is stationary, virtually no mapping is happening. The only data being mapped is from the same scans over and over again. Another problem with relying on vehicle movement to map data is that the integrity of the scans is dependent on the vehicle's speed. As the vehicle goes faster, the distance between scans increases. This could lead to obstacles being missed.

2) Moving obstacles cannot be detected reliably. This is due to the fact that the LADAR scans are fixed. If an obstacle were to be in between two LADAR scans and moving at a similar speed and direction as the vehicle (e.g. another vehicle), the obstacle could be missed in the conventional approach.

3) In general, the conventional approach uses more computing resources than the present invention. For example, in the conventional approach, since the LADAR units are scanning horizontally, scan data must be placed into a large terrain elevation map. To detect obstacles, this terrain elevation map must be searched. This is a computationally expensive process.

In one embodiment of the present invention, the imaging sensor 8 constantly oscillates to produce the three-dimensional scan. Accordingly, there is no need for vehicle motion to map data. Nor is there any need in the present invention to store massive amounts of map or sensor data in order to detect obstacles. Furthermore, the present invention in one embodiment only stores data of the geospatial locations of all the currently-identified obstacles, such as for example an obstacle that is within a certain distance of the vehicle and that has been seen within a certain amount of time. For example, in the present invention, an obstacle is considered pertinent if it was within 50 meters of the vehicle and if it had been seen within the last 5 seconds. Other definitions of pertinent obstacles based on their distance and historical observance in the field of view are possible.

Other advantages of the present invention include the detection of moving obstacles and the elimination of blind spot hidden obstacles. Since the imaging sensor 8 in one embodiment of the present invention rescans the same area multiple times per second, the chances of missing an obstacle are reduced as compared to a single scan over one area. As long as the area of oscillation covers a given area, any obstacle within that area should be seen.

Figure 6A:
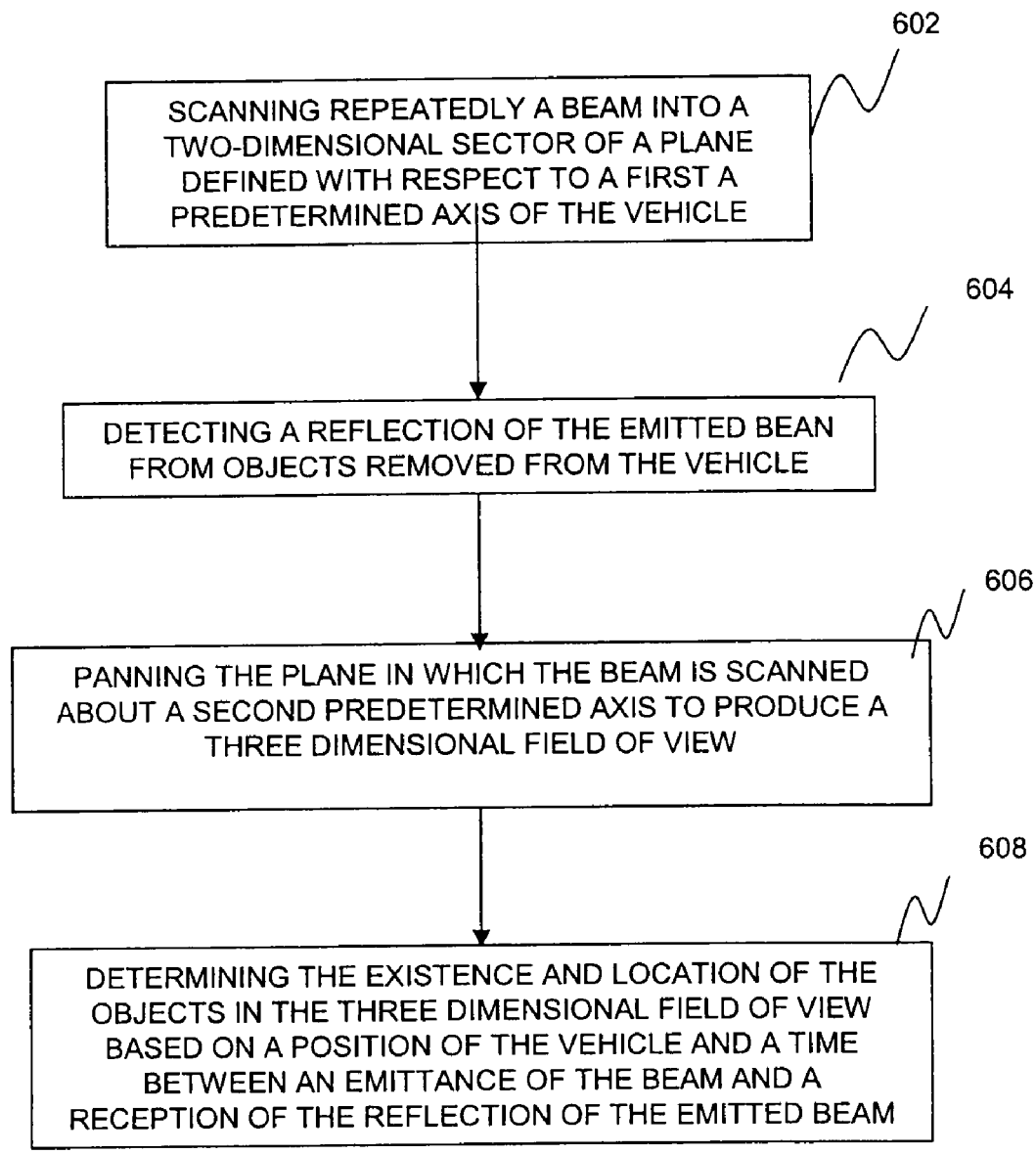
FIG. 6A is a flow chart illustrating particular method steps of the present invention.

In one embodiment of the present invention, processor 24 is configured to perform the illustrative steps shown in FIG. 6A. At step 602, a sensing beam is repeatedly scanned into a two-dimensional sector of a plane defined with respect to a first predetermined axis of the vehicle. At step 604, a reflection of the emitted beam from objects removed from the vehicle is detected. At step 606, the plane in which the beam is scanned is panned about a second predetermined axis to produce a three dimensional field of view. At step 608, the existence and location of the objects in the three dimensional field of view based on a position of the vehicle and a time between an emittance of the beam and a reception of the reflection of the emitted beam is determined.

The method of the present invention in one embodiment emits the beam into substantially a vertical sector. Accordingly, slope data related to the terrain and depressions or obstacle protruding from the terrain are accessible from the scan in the vertical sector without having to process the full three dimensional field of view. In one embodiment of the present invention, the processor operating with a vertically oriented sensor 8 does not need to process the full three dimensional field of view. The vertical scan lines (e.g., scans in a) originate from the vehicle and have slope data encoded in data due to the vertical orientation. Each independent scan line provides data of relevant obstacles.

The method of the present invention in one embodiment obtains a heading of the vehicle and a geospatial position of the vehicle, and processes data including the distance to the object, the direction to the object, the heading of the vehicle, and the geospatial position of the vehicle to determine whether the path for the vehicle intersects the object for example based on a predicted position of the vehicle. As discussed below, path planning and speed algorithms are used to direct the vehicle around the obstacles. The method of the present invention in one embodiment forms a three-dimensional field of view for the vehicle by scanning the beam in an angular sector of the plane while displacing the beam out of the plane, as shown in FIG. 1B.

The method of the present invention in one embodiment determines an angular coordinate of the beam relative to the second predetermined axis for the direction to the object and offsets the angular coordinate by an amount indicative of a time delay in receiving a signal indicative of the angular coordinate at a processor (used to calculate the location of the object). This permits a more accurate determination of the location of the object.

The method of the present invention in one embodiment directs the beam into respective angular sectors. The processor can determine the predetermined angular sectors based on a number of factors including but not limited to vehicle speed, an identified obstacle location, and a projected path of the vehicle. In the present invention, the sectors and/or the panning rate of each sector can be adjusted based upon some of the following non-limiting factors:

1) if an area of interest does not have adequate scan data (i.e. it has not been scanned enough times to be confident in that area), the sectors can be adjusted to give that area of interest more coverage especially if the area of interest includes a projected path of an obstacle (i.e. projected path of a moving obstacle) or if the area of interest includes an obstacle with complexity (i.e., if a composite obstacle seems to have many facets and/or other features warranting more scans), or if the area of interest includes an obstacle density (i.e., if one area has more obstacles than another, the sectors and/or speed to cover that area are appropriately adjusted);

2) if other sensor input such as a stereoscopic camera or radar sees an anomaly in an area or if an infrared camera picks up a high heat signature, for example of a human being, animal, or engine block, the sectors can be adjusted to provide better coverage in that area;

3) if a priori information is known, such as for example from a topographical map indicating that a cliff should be on the left side of the road, then the sectors could be adjusted to scan where the cliff should be to ensure safety;

4) if the vehicle was being operated in a convoy mode (either following a lead vehicle or possibly a walking human), the sectors could be adjusted to keep the lead vehicle or human in view;

5) if the vehicle was being operated as part of weapons targeting, the sectors could be adjusted to provide higher resolution coverage of the target area;

6) if information from other vehicles informs the autonomous vehicle about an area of interest, then the sectors could be adjusted to concentrate on the area of interest;

7) if a driver through an input device such a keyboard or mouse indicates an area is of interest, the sectors could be adjusted to concentrate on the area of interest;

8) if the autonomous vehicle receives a friend or foe signal, the sectors could be adjusted based upon whether the other vehicle is broadcasting a friend signal or a foe signal; and 9) if the autonomous vehicle expects a landmark to appear in a certain area, the sectors could be adjusted to look for the landmark in that area (landmark recognition is one way to enhance navigational accuracy).

Accordingly, the method of the present invention in one embodiment determines the angular sectors (and/or the panning rate to scan with) based on at least one of a vehicle speed, an identified obstacle location, a projected path of the vehicle, a resolution required to resolve a complex obstacle or a collection of obstacles to be resolved, other sensory input, an identified priority sector in which an obstacle has been identified (e.g., a region in which high threat obstacles exist), and auxiliary information indicating the presence of an obstacle, a moving obstacle, another vehicle, a landmark, or an area (or region) of interest. When the imaging sensor 8 is configured in a vertical orientation, as shown in FIG. 1A, it may not even be necessary to pan the beam as shown in FIG. 1B, in which case the panning rate could be set to zero with the obstacles being identified on the basis of a single scan in which the angle α is varied, as discussed above.

The method of the present invention in one embodiment stores in memory indicators of whether an obstacle exists in a subsector of the three dimensional field of view. The method of the present invention in one embodiment further determines if a projected path of the vehicle intersects one of the subsectors containing the indicators.

Figure 6B:
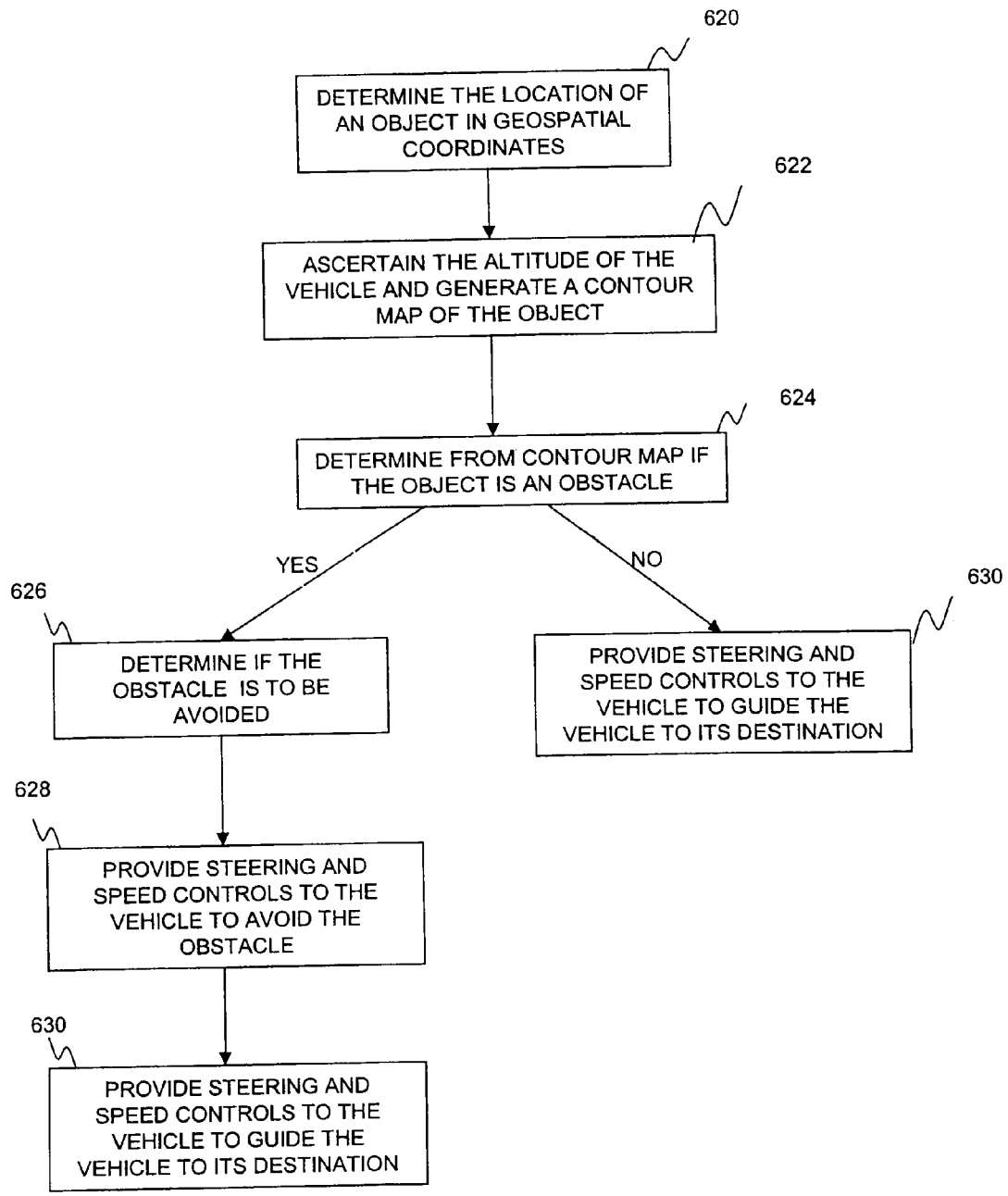
FIG. 6B is a flow chart illustrating particular method steps of the present invention for obstacle identification and avoidance.

One method of the present invention for obstacle identification and avoidance is illustrated by the flowchart in FIG. 6B. At 620, the location of the object is determined in geospatial coordinates. In this step, the method determines angular coordinates (for the direction to the object) of the beam relative to the predetermined axis, obtains positioning data from a global positioning system device disposed on the vehicle, and/or obtains orientation data for the predetermined axis of the vehicle in a geospatial coordinate system. In this step, the method processes at least one of the angular coordinates, the positioning data, and the orientation data to determine the location of the object in geospatial coordinates. In one embodiment of the present invention, the data processed is limited to data for objects within a predetermined distance of the vehicle.

At 622, the altitude of the vehicle is ascertained, and from that information the present invention determines an elevation of the object by correlating the location of the object relative to the vehicle with the geospatial position of the vehicle and the altitude of the vehicle, determines elevations for plural points on the object, and/or generates a contour map for the object.

At 624, the present invention determines if the object is an obstacle. For instance, as detailed by the vector equations (1)-(3) listed above, one embodiment of the present invention determines if the object is an obstacle by assessing if there exists a first point on a contour map (or in the field of view) that is farther away from the vehicle than a second point P on the contour map, if a slope between the first point and the second point is greater than a predetermined slope, and if a height between the first point and the second point is greater than a predetermined height.

At 626, if the object is an obstacle, the present invention determines if the obstacle is to be avoided, for example by determining if a geospatial position of the obstacle remains in the path of the vehicle over a time lapse period and/or by determining if a geospatial position of the obstacle is within a set distance from the vehicle. In one embodiment of the present invention, the obstacle (now identified) is mapped relative to the path of the vehicle.

At 628, if the object is an obstacle, steering and speed control directions are provided to the vehicle in order to avoid the obstacle. The steering and speed control directions can take into consideration the destination of the vehicle, and thereby provide steering and speed control directions to the vehicle in order to avoid the obstacle and to return on course to the destination.

Or, at 630, if no obstacles are present, then the steering and speed control directions provide steering and speed control directions to the vehicle to guide the vehicle to the destination.

Figure 7A:
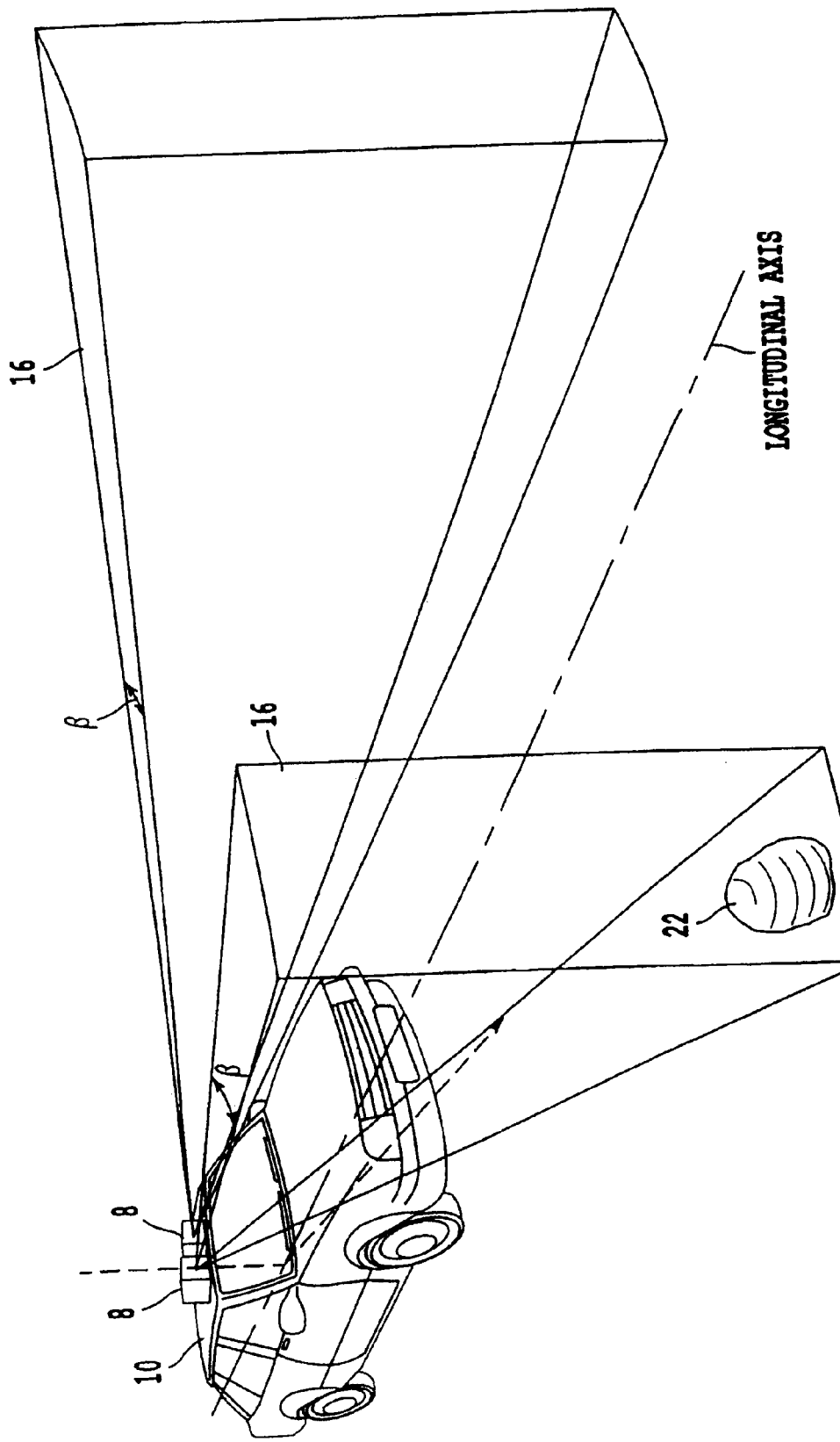
FIG. 7A is a schematic illustration of a vehicle according to the present invention utilizing multiple LADAR imaging sensors to scan separate fields of view.

FIG. 7A is a schematic illustration of a vehicle according to the present invention depicting one embodiment in which multiple LADAR imaging sensors are used. In this embodiment, one or more of the imaging sensors is dedicated to scanning for the detection of objects nearby the vehicle (e.g., within 50 m) while another of the imaging sensors is dedicated to scanning for the detection of objects farther away from the vehicle (e.g., beyond 50 m).

Figure 7B:
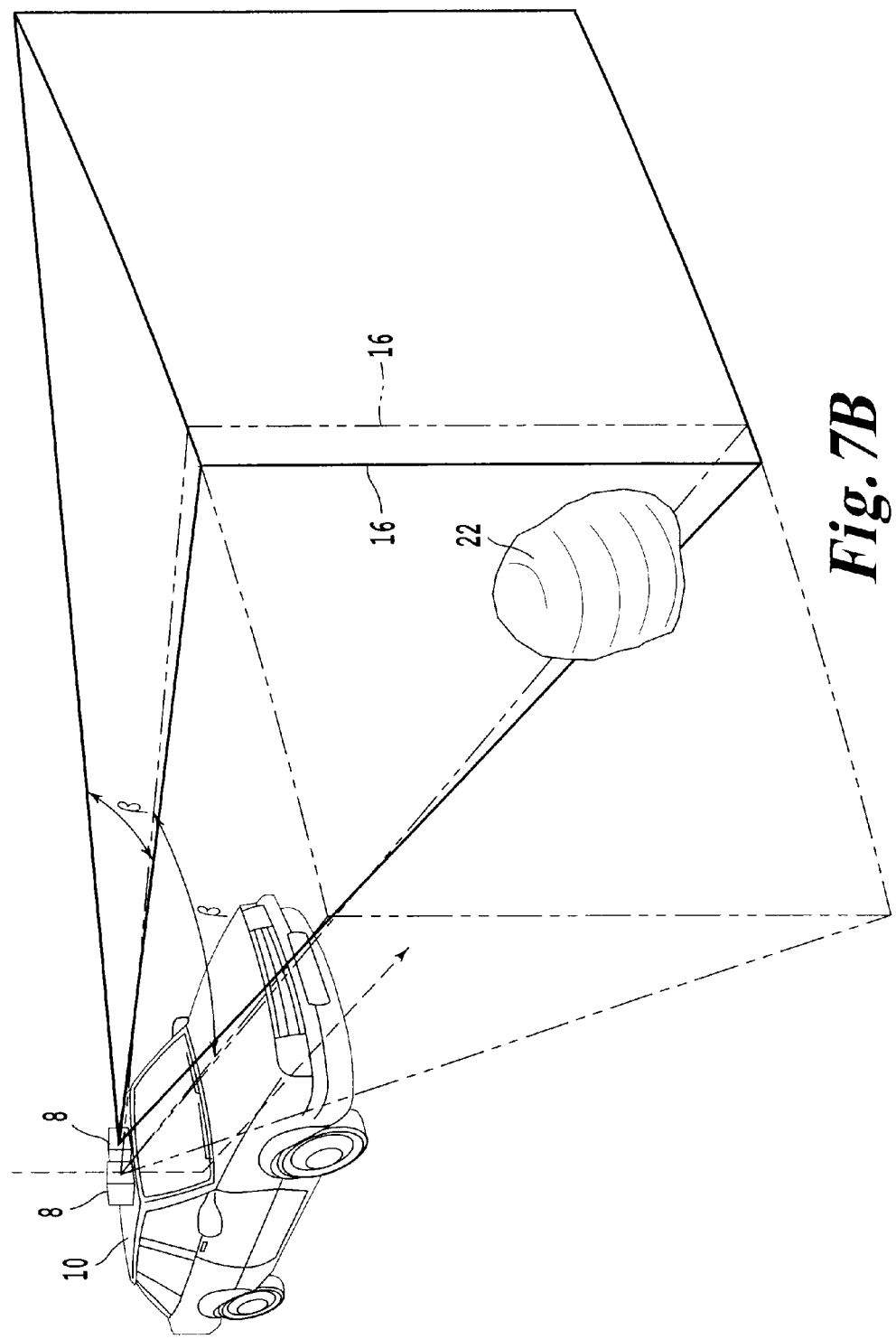
FIG. 7B is a schematic illustration of a vehicle according to the present invention utilizing multiple LADAR imaging sensors to scan the same or overlapping fields of view.

In another embodiment of the invention, multiple imaging sensors are used for redundancy and to provide different perspectives of the same object. FIG. 7B is a schematic illustration of a vehicle according to the present invention depicting one embodiment in which multiple LADAR imaging sensors are used to scan the same or overlapping fields of view. This configuration provides redundant coverage in the center of the path so that, if one imaging sensor 8 fails, the other one can still sense obstacles most likely to be directly in the vehicle's path. The data from the imaging sensors 8 are correlated by placing all data onto the same elevation grid (as illustrated for example in FIG. 5).

In another embodiment, the imaging sensors 8 are configured to locate objects removed from a vehicle 10; and processor 24 is configured to direct one of the sensors to scan a first sector associated with a path of the vehicle, while directing another of the sensors to scan a second sector identified with an obstacle. As such, the first and/or second sector determinations can be based on a number of factors including, but not limited to a vehicle speed, an identified obstacle location, a projected path of the vehicle, a resolution required to resolve a complex obstacle or a collection of obstacles to be resolved, sensory input other than from the sensors, an identified priority sector in which an obstacle has been identified, and auxiliary information indicating the presence of an obstacle, a moving obstacle, another vehicle, a landmark, or an area of interest.

In one variant of this embodiment, the processor 24 can direct one sensor to scan a first sector associated with a path of the vehicle, and in a programmed manner direct the same sensor (e.g., in a dynamic fashion) to scan a second sector identified with an obstacle. Factors which determine the programmed duty cycle by which one sensor scans the first sector and then a second sector include for example the speed of the vehicle, the proximity of the obstacle, any movement of the obstacle, an identified status of the obstacle (e.g., friend or foe), the proximity of the obstacle to the projected path of the vehicle, and the calculated clearance from the vehicle to the obstacle.

Moreover, in one embodiment of the present invention, one of the imaging sensors 8 is dedicated to scanning in a horizontal direction while another imaging sensor is directed to scan in the vertical direction. Scan information from this unit permits the processor 24 to better identify the general terrain and terrain curvature from which obstacles such as shown in FIG. 5 can be identified. Complementary data from both horizontal and vertical scans helps identify the edges of composite obstacles (groups of individual obstacles that should be treated as one obstacle) more accurately. One of the issues with handling moving obstacles is determining the full proportions of an obstacle. To calculate the full proportions of an obstacle, multiple "independent" obstacles are intelligently grouped to form one larger composite obstacle when for example the data points representing the independent obstacles are within a set distance of each other (e.g., within 100 cm). Moreover, in other embodiments of the present invention, the grouping into composite obstacles is set by more than just a distance of separation between points normally qualifying as an obstacle point. Other factors that can be used in the determination include for example the number of times each point identified as an obstacle is seen, whether the obstacle point moves spatially in time, and whether (as discussed elsewhere) if there is confirmation of the obstacle by other image sensors or stereographic cameras.

Having two completely different perspectives of the obstacles facilitates this task by the obstacles being viewed from two separate dimensions (i.e., from top to bottom and from left to right). Since the beams tend to wrap around the curvature of an obstacle, this provides accurate estimations of the size and orientation of a composite obstacle. For instance, consider a spherical boulder. While the backside of the spherical boulder can not be seen, the sensing beam maps out a contour of the spherical boulder providing the aforementioned size and orientation, providing an estimate of the full size of the spherical boulder. Furthermore, having stepper motors (or in general any motor that can have its position dynamically adjusted) oscillate the platform rather than a continuously revolving motor creates several distinct advantages: 1) the rate at which the platform oscillates can be changed dynamically, and 2) the size of the sector which is scanned can be dynamically changed.

By having these dynamic capabilities, the present invention achieves several advantages:

1) Path (or road) curvature can be tracked in the present invention. As the path in front of the vehicle curves, the imaging sensors 8 can change their sector to better match the path, thereby ensuring that the path always gets the best coverage. This also helps to ensure that hard 90 degree or more turns do not create blind spots on the path. An imaging sensor that cannot alter its sector would be fixated ahead of the vehicle, even though the path is turning towards the right or left, and therefore blindspots in the viewing field would develop that would not resolved until after the vehicle had started turning. Accordingly, in one embodiment of the present invention, the sensors 8 can preemptively adjust their orientation. For example, the imaging sensor 8 shown in FIG. 1B or the multiple imaging sensors 8 shown in FIGS. 7A and 7B can be directed into a three-dimensional field of view that follows the anticipated path of the vehicle 10 on for example a highway. Further, the angular sectors mapped by the multiple imaging sensors 8 can be dynamically adjusted using stepper motors to vary (in real time) the angular sector $3 scanned and the angular scan rate. Factors which influence selection of the angular sector to be scanned include vehicle speed, an identified obstacle location relative to a turn in a path of the vehicle, a projected path of the vehicle, a resolution required to resolve a complex obstacle or a collection of obstacles to be resolved, sensory input other than from the sensors, an identified priority sector in which an obstacle has been identified, and auxiliary information indicating the presence of an obstacle, a moving obstacle, another vehicle, a landmark, or an area of interest.

2) The speed of oscillation of the platform can be adjusted based on the speed of the vehicle. If the vehicle is going slower, the speed of oscillation can be reduced, thereby causing a higher resolution 3D image of the environment. As the vehicle speeds up, the speed of oscillation can increase to give better overall coverage of obstacles further down the road. Accordingly, in one embodiment of the present invention, the angular scan rates for a and $\beta$ (as shown in FIGS. 1A and 1B can be proportionate to the vehicle speed. Furthermore, in one embodiment of the present invention, as the vehicle moves faster, the scanned sectors could move farther out, or the speed of oscillation could change, or the angular sector could narrow (or all three could occur). The converse would apply when the vehicle slows down.

3) Obstacles can be tracked in the present invention. Multiple imaging sensors can track obstacles and adjust their sectors to ensure that high threat obstacles are tracked (i.e., priority sectors or regions of interest can be established). For example, in one embodiment of the present invention, there are three imaging sensors on the front of the vehicle. If an obstacle is detected, two imaging sensors can keep analyzing the path, while the other sensor changes its sector to ensure that the obstacle can be scanned. Such capability permits the tracking of moving obstacles or other vehicles or for passing another vehicle at relatively high speed. Accordingly, in one embodiment of the present invention, respective ones of the imaging sensors 8 can be dedicated to imaging and obstacle identification and tracking in predetermined sectors.

4) Zone coverage is another advantage that can be realized in the present invention. The processor 24 could specify several zones around the vehicle with different levels of priority and multiple imaging sensors could dynamically adjust their sectors to make sure that all zones were covered based upon priority. For example, if the path directly in front of the vehicle were the highest priority and the sides of the vehicle were lower priority, then the sensors could be dynamically adjusted to always ensure that the front of the vehicle was adequately covered, and if additional sensors were available, then the sides would be covered too. This approach allows for easy scalability and fault tolerance. The processor 24 in one embodiment of the present invention could realize that one of the sensors had failed, and then dynamically adjust for the failed sensor to ensure that the proper zones were always covered. Adding sensors increases coverage areas and redundancy or fault tolerance. Accordingly, in one embodiment of the present invention, respective ones of the imaging sensors 8 provide hardware redundancy and field of view redundancy.

Besides input from redundant imaging sensors, the processor 24 in one embodiment of the present invention receives input from on-board vehicle sensors. One of these inputs is a wheel speed sensor which provides transistor-transistor logic (TTL) pulses based upon an encoder placed on a single wheel on the vehicle. When a wheel speed sensor is added, the processor 24 uses GPS data from the positioning device 25 to initially calibrate the TTL pulses to actual vehicle movement. In the event that GPS data is not available, due to for example tunnels, canyons, or other obstructions, the processor 24 is able to minimize the positional drift by making use of the wheel speed sensor and its latest reliably known correspondence to the vehicle's movement.

The wheel speed sensor included a digital sensor capable of detecting either ferrous metal or magnets that are in motion. The digital sensor was mounted in the wheel well adjacent to the stock Antilock Brake System (ABS) sensor, which allowed the wheel speed sensor to read the same magnets mounted on the wheel that the ABS sensor did. This level of accuracy permits the vehicle 10 to precisely know its location on the earth.

Another input to processor 24 (as described later) is input from a biometric sensor or input from command button in which a driver to the vehicle can relinquish or take control of the vehicle 10.

Figure 8:
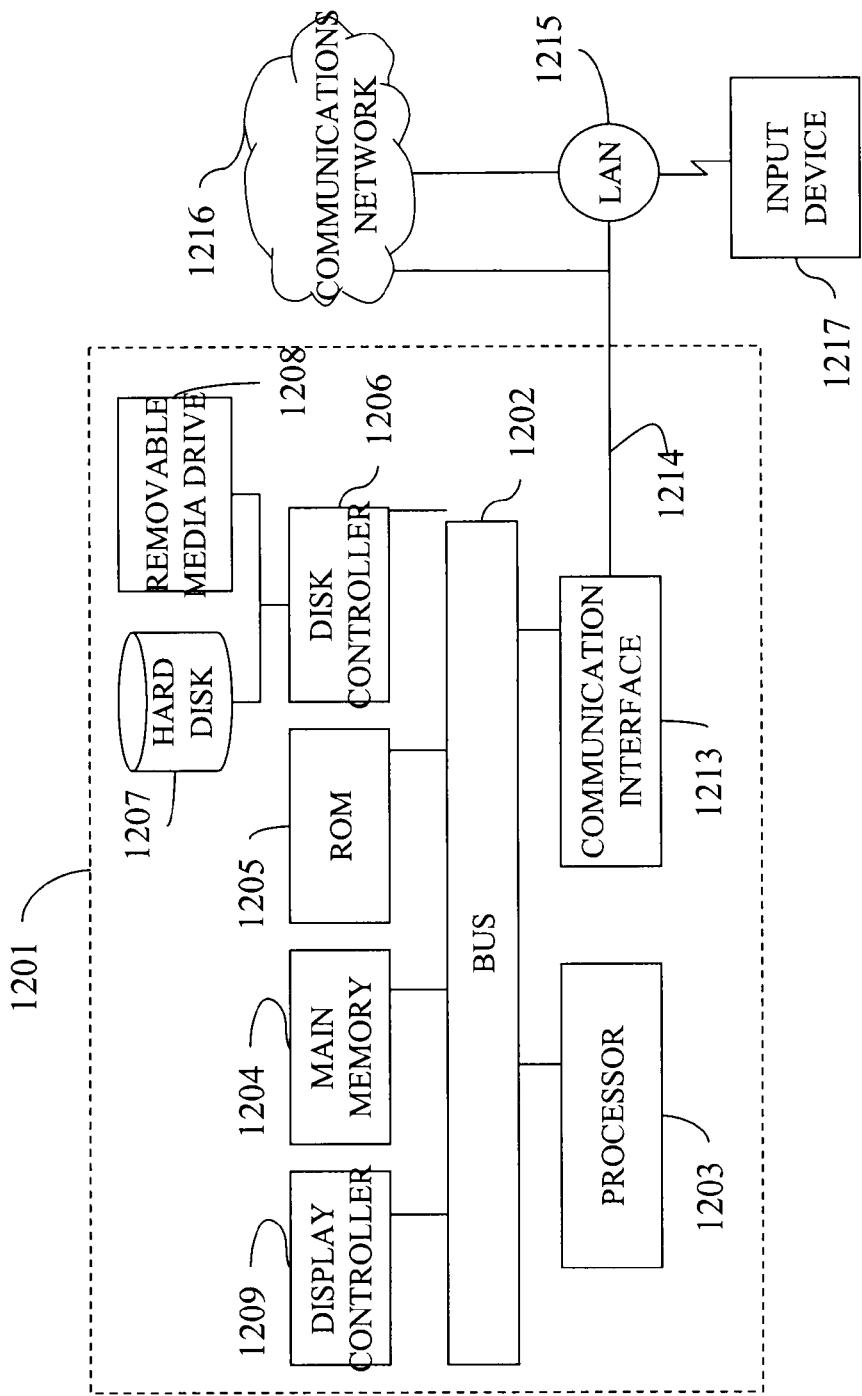
FIG. 8 is a schematic illustration of an exemplary computer system of the present invention.

FIG. 8 illustrates one embodiment of a computer system 1201 in which the processor 24 (or any of the specific processors discussed below) of the present invention can be implemented. The computer system 1201 is programmed and/or configured to perform any or all of the functions described above. Further, respective functions can be divided among different computers on board the vehicle (as shown for example in the computing network system of FIG. 9). These computers may be in communication with each other via the communications network 1216 (discussed below). The computer system 1201 includes a bus 1202 or other communication mechanism for communicating information, and a internal processor 1203 coupled with the bus 1202 for processing the information. The computer system 1201 includes a memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by the internal processor 1203. In addition, the memory 1204 may be used for storing temporary variables or other intermediate information during the execution of instructions by the internal processor 1203. The computer system 1201 preferably includes a non-volatile memory such as for example a read only memory (ROM) 1205 or other static storage device (e.g., programmable ROM (PROM), erasable PROM (EPROM), and electrically erasable PROM (EEPROM)) coupled to the bus 1202 for storing static information and instructions for the internal processor 1203.

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)). The computer system may also include one or more digital signal processors (DSPs) such as the TMS320 series of chips from Texas Instruments, the DSP56000, DSP56100, DSP56300, DSP56600, and DSP96000 series of chips from Motorola, the DSP1600 and DSP3200 series from Lucent Technologies or the ADSP2100 and ADSP21000 series from Analog Devices. Other processors especially designed to process analog signals that have been converted to the digital domain may also be used (as detailed in the working example below).

The computer system 1201 performs a portion or all of the processing steps of the invention in response to the internal processor 1203 executing one or more sequences of one or more instructions contained in a memory, such as the main memory 1204. Such instructions may be read into the main memory 1204 from another computer readable medium, such as a hard disk 1207 or a removable media drive 1208. Such instructions may be read into the main memory 1204 from another computer readable medium, such as a USB flash drives or jump drives. Such drives are solid-state memory devices which have the ability to act as floppy disks or hard drives under most computer operating systems. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media suitable for the present invention are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., a driver). Such software may include, but is not limited to, device drivers, operating systems, development tools, and applications software. Such computer readable media further includes the computer program product of the present invention for performing all or a portion (if processing is distributed) of the processing performed in implementing the present invention. The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the internal processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to internal processor 1203 for execution. For example, the instructions may initially be carried on a disk to a remote computer. An infrared detector coupled to the bus 1202 can receive the data carried in the infrared signal and place the data on the bus 1202. The bus 1202 carries the data to the main memory 1204, from which the internal processor 1203 retrieves and executes the instructions. The instructions received by the main memory 1204 may optionally be stored on storage device 1207 or 1208 either before or after execution by the internal processor 1203.

For instance, in one embodiment of the present invention, a computer readable medium contains program instructions for execution on a processor in a vehicle, which when executed by the processor, cause the processor to scan repeatedly a beam into a two-dimensional sector of a plane defined with respect to a first predetermined axis of the vehicle, to detect a reflection of the emitted beam from an object removed from the vehicle, to pan the plane in which the beam is scanned about a second predetermined axis to produce a three dimensional field of view, and to determine the existence and location of the object in the three dimensional field of view based on a position of the vehicle and a time between an emittance of the beam and a reception of the reflection of the emitted beam.

In one embodiment of the present invention, a computer readable medium contains program instructions for execution on a processor in a vehicle, which when executed by the processor, cause the processor to scan objects in a field of view from the vehicle, to determine a location of the objects in the field of view, to determine first and second points on a contour map of an identified object, to determine if the first point is farther away from the vehicle than the second point, to determine a slope between the first point and the second point, to determine if the slope is greater than a predetermined slope, and to determine if a height between the first point and the second point is greater than a predetermined height, and if so, to determine that the object is an obstacle.

In one embodiment of the present invention, a computer readable medium contains program instructions for execution on a processor in a vehicle, which when executed by the processor, cause the processor to scan objects in a field of view from the vehicle, to determine a location of the objects in the field of view, to perform an obstacle identification algorithm to determine if any object is an obstacle, to determine a field of view subsector in which a determined obstacle exists, and to store in a corresponding memory element an obstacle indicator indicative that an obstacle exists in a corresponding subsector.

In one embodiment of the present invention, a computer readable medium contains program instructions for execution on a processor in a vehicle, which when executed by the processor, cause the processor to scan objects in a field of view from the vehicle, to determine a location of the objects in the field of view, to direct a scan in a first sector associated with a path of the vehicle, and to direct a scan in a second sector identified with an obstacle.

In one embodiment of the present invention, a computer readable medium contains program instructions for execution on a processor in a vehicle, which when executed by the processor, cause the processor to scan objects in a field of view from the vehicle, to determine a location of the objects in the field of view, to direct a scan selectively in a sector associated with a projected turn in a path of the vehicle.

The program instructions, in various embodiments of the present invention, are configured to cause the processor to determine which of the sectors to scan based on at least one of a vehicle speed, an identified obstacle location, a projected path of the vehicle, a resolution required to resolve a complex obstacle or a collection of obstacles to be resolved, sensory input other than from the sensors, an identified priority sector in which an obstacle has been identified, and auxiliary information indicating the presence of an obstacle, a moving obstacle, another vehicle, a landmark, or an area of interest.

Further, the computer readable medium of the present invention can include program instructions detailing geographical information associated with a particular locale, path planning algorithms (as described below), navigational instructions, instructions particular to an installed image sensor on the vehicle, instructions for command and/or receipt of data from additional sensors such a stereoscopic cameras, or vehicle wheel speed sensors, or receipt of data from driver input control devices or other on-board devices (such as those described later), path planning algorithms, a particularized vehicle transfer function containing data regarding vehicle thrust and response to external forces for the autonomous vehicle in use, and steering control for the autonomous vehicle in use.

The computer system 1201 also includes a communication interface 1213 coupled to the bus 1202. The communication interface 1213 provides a two-way data communication coupling to a network link 1214 that is connected at least temporarily to, for example, a local area network (LAN) 1215, or to another communications network 1216 such as the Internet during downloading of software to the processor 24 or an internal network between multiple computers on board the vehicle. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented as part of the communication interface 1213 to provide data exchange with any of the on-board computers, image sensors, wheel speed sensors, biometric sensors, and/or driver command input devices. In any such implementation, the communication interface 1213 sends and receives electrical, electromagnetic or optical signals that carry digital data streams representing various types of information.

The network link 1214 typically provides data communication through one or more networks to other data devices to provide data exchange with any of the on-board computers, image sensors, wheel speed sensors, biometric sensors, and/or driver command input devices. For example, the network link 1214 may provide a temporary connection to another computer through a local network 1215 (e.g., a LAN) or through equipment operated by a service provider, which provides communication services through a communications network 1216. As shown in FIG. 8, the computing system 1201 can be in communication with an input device 1217 via the local network 1215 and the communications network 1216 which use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214, and the communication interface 1213. Moreover, the network link 1214 may provide a connection through a LAN 1215 to the various GPS and INS systems on board the vehicle. The input device 1217 in various embodiments of the present invention provides input to the processor 24 and represents schematically the image sensors, wheel speed sensors, biometric sensors, and/or driver command input devices discussed in the present invention.

Working Example

A 2005 Ford Escape Hybrid™ (hereinafter referred to as the working vehicle) was modified to include the imaging sensors 8 of the present invention. The working vehicle used a hybrid drive system in which an electric engine operates virtually all of the time and in which the gas engine starts and stops automatically to either provide extra horsepower or to recharge the electric engine's battery. The working vehicle's electrical system, which was powered by a 330-volt battery, provides over 1300 watts of power to the equipment mounted in the working vehicle.

The working vehicle utilized a commercially available Advanced Electronic Vehicle Interface Technology (AEVIT) "drive-by-wire" system from Electronic Mobility Controls (EMC) to physically control the car. The AEVIT system uses redundant servos and motors to turn the steering wheel, switch gears, apply throttle, and apply brake. This commercial system has a proven safety record in the automobile industry due to its use of redundant hardware.

The working vehicle provided 110 amps of power at 12 volts. The imaging sensor 8 utilized in the working vehicle operated on 24 volts. Rather than provide this power from the working vehicle's 12 volt electrical system, an auxiliary 24 volt electrical system for the imaging sensor was provided. The auxiliary electrical system included two 12 volt batteries connected in series to provide 24 volts of power. Solar panels were installed on top of the vehicle to charge the batteries in the auxiliary system.

In the working vehicle, a 2.8 Gigahertz Intel Pentium III™ processor including 2 gigabytes of RAM was used as the processor 24. The 2.8 Gigahertz Intel Pentium III™ processor operated on 12 volt power supply, so an AC to DC power inverter was not needed. The 2.8 Gigahertz Intel Pentium III™ processor hosted the principle computing functions, such as for example the sensor communication, vehicle controls, and artificial intelligence.

Additionally, the working vehicle included several 1.42 Gigahertz Apple Mac Mini™ computers to host the path-planning software. The 1.42 Gigahertz Apple Mac Mini™ computers (running on running Apple OS X 10.4 software) were programmed to perform all of the path calculations in a redundant cluster to ensure that the path planning software was not suspect to a single point of failure. The Mac Mini™ computers had low power consumption (less than 2.3 amps at peak) and vector math processing capabilities. The processors listed above can be shock mounted on the vehicle to prevent damage from sudden changes in the direction of the vehicle or the crossing of obstacles along the path.

Figure 9:
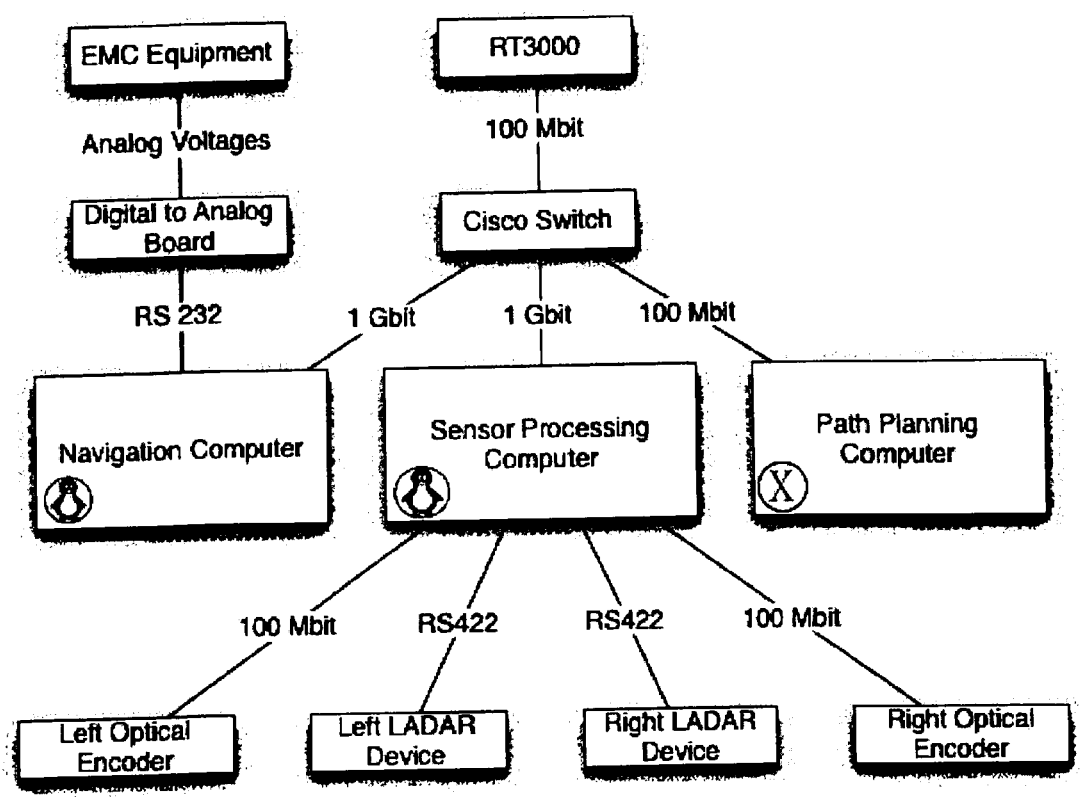
FIG. 9 is a high level schematic of a computing network system of the present invention.

FIG. 9 shows a high level schematic of a computing network system of the present invention employing the computers and sensor data discussed above. In this networked system, the individual processors have similar capabilities and computer elements as described with respect to FIG. 8. FIG. 9 shows that on-board electrical motor control (EMC) equipment is driven by instructions from the Navigational Computer. The Navigational Computer is connected by a switch (shown as a CISCO Switch) to a Sensor Processing Computer and a Path Planning Computer. These computers receive input from the RT3000™ GPS and INS positioning device (described below). The Path Planning Computer and the Navigational Computer utilize various path planning and speed control algorithms (described below) to provide steering instructions to the vehicle. The Sensor Processing Computer as shown in one illustrative embodiment of the present invention receives input from imaging sensor 8 (for example the LADAR devices shown) and encoders on the shaft of a LADAR device (for example the optical encoders shown). The LADAR devices provide distance data and the instantaneous angle α of the LADAR device in the predetermined angular scanning sector as shown in FIG. 1A. In one embodiment, optical encoders are used as the rotary encoders 32 discussed above and provide the Sensor Processing Computer with the panning angle β relative to for example a vertical axis, as shown in FIG. 1B. Optical encoders are used in this embodiment of the present invention because of their high accuracy. Since optical encoders do not rely on physical contact with the shaft 34, but rather visually determine movement, optical encoders are more accurate and less prone to failure. The encoders from Fraba Posital were specifically used in the working vehicle because of their Ethernet capability.

The working vehicle utilized RT3000™ positioning devices from Oxford Technical Solutions to provide vehicle localization (i.e., positioning data). The RT3000™ uses Omnistar™ HP differential GPS signals to provide position accuracy of 10 centimeters or less. Integrated INS in the RT3000™ permits the RT3000™ to survive GPS outages of up to 30 seconds with virtually no performance degradation. Because the GPS and INS were integrated together, each can compensate for problems with the other. For example, if the INS started to drift laterally, the integrated GPS will automatically correct that drift. In the working vehicle, two Oxford RT3000™ GPS units were employed in a primary/secondary role.

The working vehicle utilized commercially available laser modulation systems (LMS) for the imaging sensors 8 such as three SICK™ LMS 291 LADAR units and one RIEGL™ LMS-Q120 LADAR on the front of the vehicle. The LADAR units in the working vehicle were split into three different roles. The RIEGL™ LADAR was mounted vertically in the center of the vehicle and is used for long range (up to 80 meters) obstacle detection. The two SICK™ LMS 291 units were mounted vertically on either side of the RIEGL™. These vertically mounted units were used for short range obstacle detection (up to 50 meters). The other SICK™ LMS 291 was mounted horizontally on the center of the vehicle and is used for analyzing terrain features.

In order to protect these sensors from the elements as much as possible, a sun/weather guard was constructed over the sensor mounts. This guard protects the LADAR units from being blinded by direct sun glare, a common problem with Sick LADAR units. The guard can constitute a simple optical shield such as for example a piece of sheet-metal that was attached to the top of the imaging sensor. The guard extended over the front of LADAR unit (or other imaging sensor) and had a slight bend to better protect the sensors from the sun. Since LADAR units produce their own light source, low light conditions have no effect on the sensors. In fact, testing showed that low light conditions actually produced better results than bright conditions, due to excessive reflections under bright sunlight. These reflections, along with dust or rain, can produce ghosting patterns or other anomalies in the sensor readings. To counteract these anomalies, the present invention utilizes filtering algorithms to correct for anomalies before the anomalies can cause problems in the path planning software. For example, the filtering algorithm in one embodiment associates isolated obstacle points with noise data and discards these data points, under the assumption that "real" obstacles have a physical size greater than the resolution of the imaging sensor.

On the working vehicle, stereoscopic cameras capable of producing a three-dimensional point cloud were mounted on the front of the vehicle behind the windshield. These cameras operated in a secondary mode to the LADAR units. The cameras are used to help identify the road and to confirm the existence of obstacles. If a LADAR unit identifies an obstacle and the stereoscopic cameras also detect an obstacle in that area, the obstacle avoidance algorithms increase the confidence level associated with that obstacle. Confidence levels were used to help decide which obstacles must absolutely be avoided and which obstacles are possibly driven over without damage.

Figure 10:
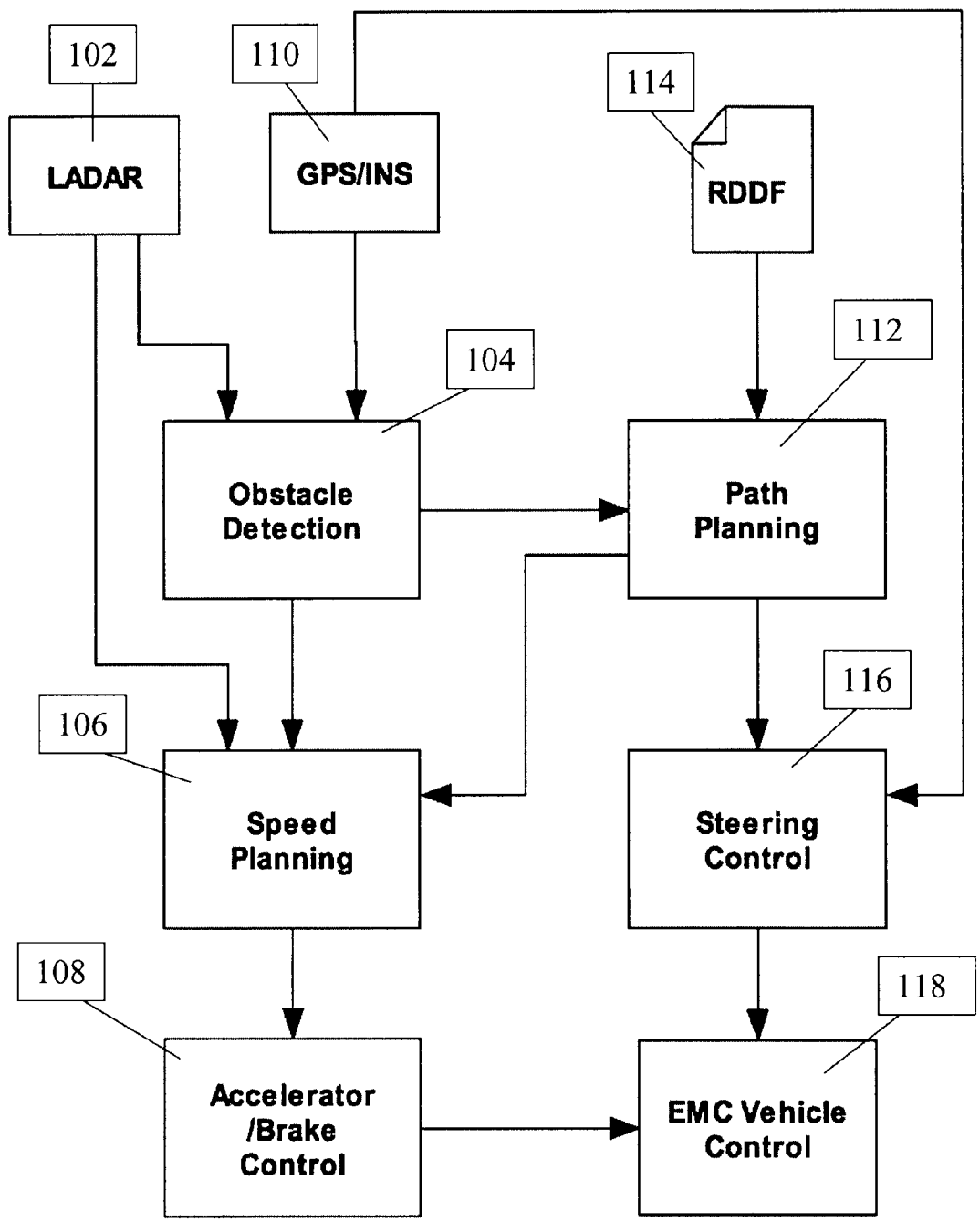
FIG. 10 is a high level schematic of the vehicle control system of the present invention.

FIG. 10 is a high level schematic of the vehicle control system of the present invention. FIG. 10 shows an iterative loop control system using inputs from the sensors and providing vehicle control. For the sake of illustration, at 102, LADAR data stored in a memory unit for example of the Sensor Processing Computer in FIG. 9 is provided to obstacle detection unit 104, speed planning unit 106, and accelerator/brake control 108. GPS/INS unit 110 also provided to the obstacle detection unit 104. Once the obstacle detection unit 104 decides which objects in the field of view are obstacles (for example using the conditions specified in eqns. (1), (2), and (3) above, obstacle identification data is forwarded to the speed planning unit 106 and to path planning unit 112. The path planning unit 112 receives input from a route definition data file (RDDF) unit 114 and provides the path data to steering control unit 116. EMC Vehicle Control 118 takes input from the steering control unit 116 and the accelerator/brake control 108 to control the working vehicle.

The obstacle detection unit 104 utilizes in one embodiment of the present invention spatial indices to correlate the sensor data with localization data indicating in which sector an obstacle is located (for example a near sector requiring immediate consideration or a far sector not requiring immediate consideration). FIG. 5 shows a division of the field of view into sectors: the sector defined between rays A and B, the sector defined between rays B and C, and the sector defined beyond C. Instead of storing all obstacles in one large spatial index, each segment of the path corridor has a corresponding spatial index in memory. Such division in one embodiment permits the present invention to call up from memory the sectors of importance for example when navigating obstacles 22a and 22b.

The obstacle detection unit 104 in one embodiment of the present invention uses times-stamps taken with each LADAR scan and GPS reading. These timestamps are then correlated based upon position and heading to produce a geospatial location for obstacles, for example the obstacles themselves may be moving. Timestamping can counteract anomalies in the images. Highly reflective surfaces can cause the LADAR devices to register incorrect distances for obstacles. To counteract these anomalies, in one embodiment of the present invention, scans are only kept in memory for a designated amount of time. After that time has passed, if no more obstacles have been registered in that same area, the obstacle is removed from memory storage. This technique ensures that moving obstacles are handled correctly. If another vehicle or an obstacle(s) crosses the vehicle path in a perpendicular direction to the autonomous vehicle, the sensors would effectively register a sequence of obstacles in front of the autonomous vehicle. These obstacles would appear as a complete obstruction of the vehicle's path, forcing the vehicle to immediately stop. After enough time had passed, the obstacles would expire, and the autonomous vehicle would be able to start moving again. A persistent obstacle, on the other hand, would not expire.

Consider, for example, a large boulder that is located in the center of the path. At a distance of approximately forty to fifty meters, the LADAR devices will start to register parts of the boulder. As vehicle 10 gets to within ten to twenty meters of the vehicle, the previous scans would begin to approach the obstacle expiration time. Since the sensors are still registering the boulder, the previous scans will not expire. Instead, the previous scans along with the current scans would all be retained, giving the boulder a higher count for total number of scans. This high count for the number of scans causes the boulder to have an extremely high probability of being an obstacle.

The path-planning algorithms of the present invention avoid obstacles and routinely steer the vehicle within a planned corridor. In one embodiment, these algorithms without cause will not deviate the vehicle from the planned corridor. However, should the vehicle leave the route corridor for some reason, the navigation system will detect this and provide a safe route back into the corridor. If a waypoint is missed, the navigation system will simply continue to the next feasible waypoint on the path. If the path is obstructed by an obstacle, the path planning systems will determine a path around the obstacle.

Path planning in one embodiment of the present invention is accomplished through the use of cubic b-splines designed to follow the center of the planned route while still ensuring that the path is not impossible for the vehicle to navigate. This assurance means that the curvature at any point along the path is below the maximum curvature that the vehicle can successfully follow. In addition, the curvature is kept continuous so that it is not necessary to stop the vehicle in order to turn the steering wheel to a new position before continuing. B-splines were chosen for use in the path planning algorithms primarily because of the ease in which the shape of their resulting curves can be controlled. After an initial path is created that follows the center of the corridor, the path is checked against the obstacle repository to determine if it is a safe path. If the path is not safe, a simple algorithm generates and adjusts control points on the problem spots of the curve until the spline avoids all known obstacles while still containing valid maximum curvature. At this point, the path is both safe and drivable.

The path planning of the present invention can also uses a Level of Detail (LOD) based obstacle avoidance algorithm along with several planning algorithms to plan paths around obstacles. LOD analysis in one embodiment of the present invention permits running the same algorithm with different levels of detail. For example, running with less detail (e.g., to accommodate large safety margins), then iteratively increasing the detail (e.g., to accommodate smaller safety margins) until a valid path is found. The path planning algorithms run using several different parameters until a valid path is found. The initial parameters use safety margins (for example the clearance of the vehicle from an obstacle or between obstacles), while the final parameters use no safety margins around obstacles. This ensures that if a path is available that will avoid an obstacle with a large margin of error (e.g., vehicle lateral clearance) the path planning software selects that path. Otherwise, the planning algorithm will keep reducing the safety margin around obstacles until a valid path is determined.

Figure 11:
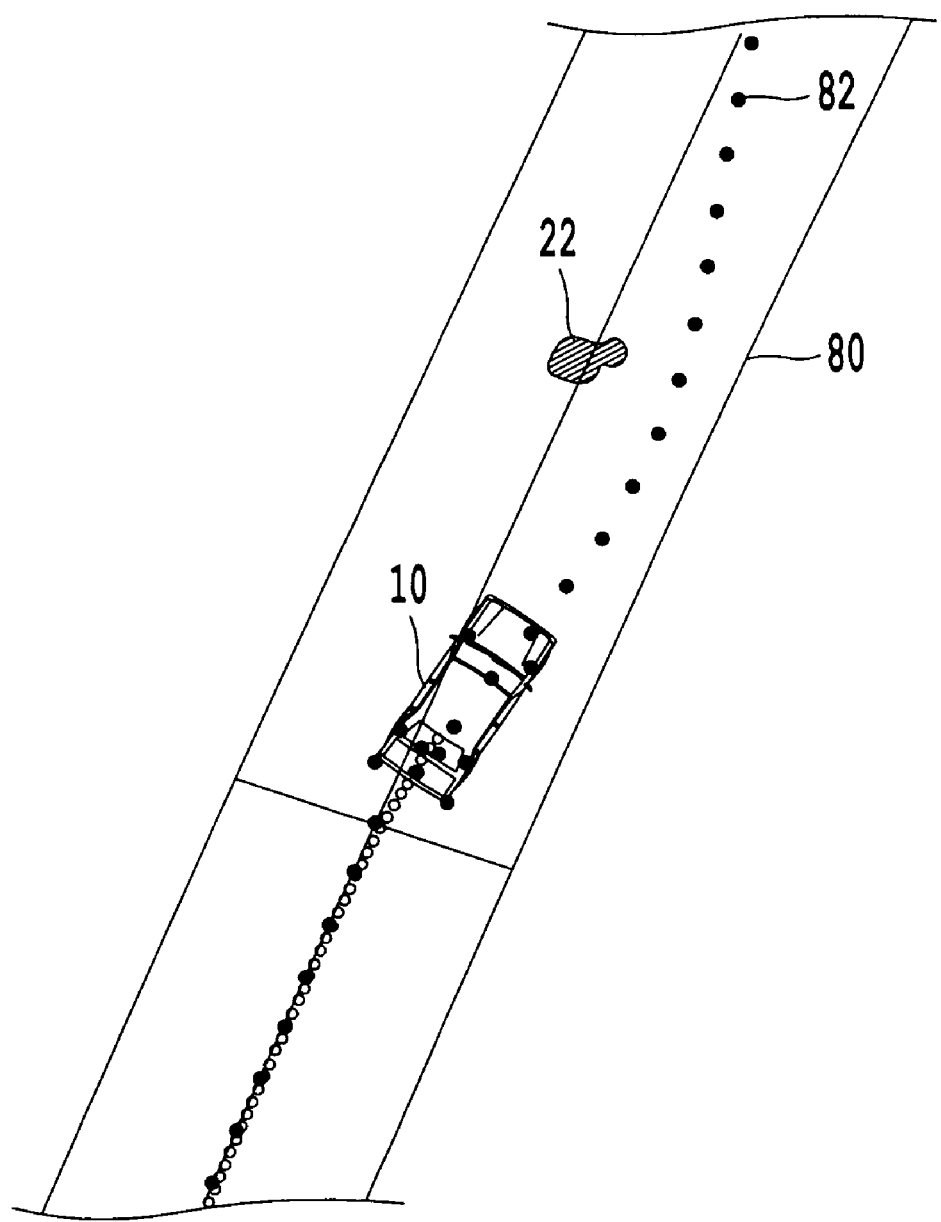
FIGS. 11-13 are schematics of path determinations made by the present invention.
Figure 12:
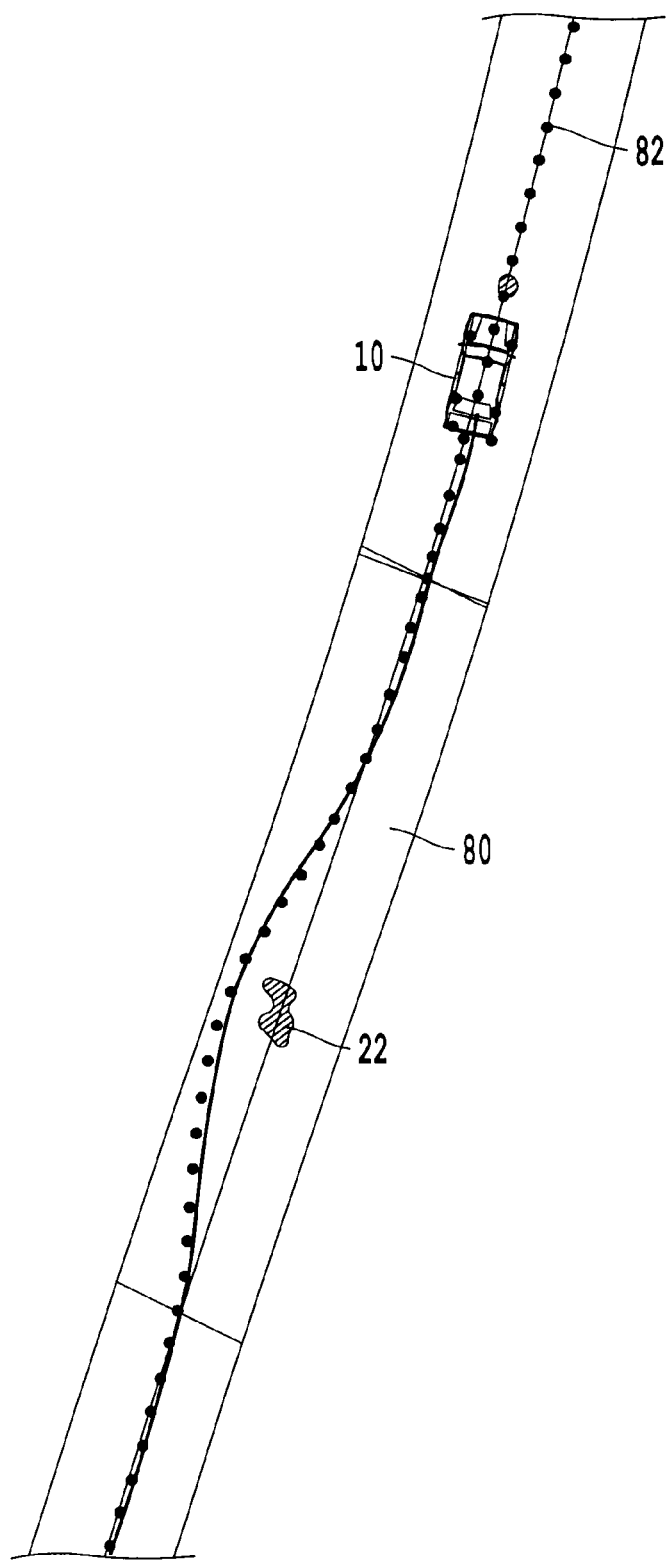
Figure 13:
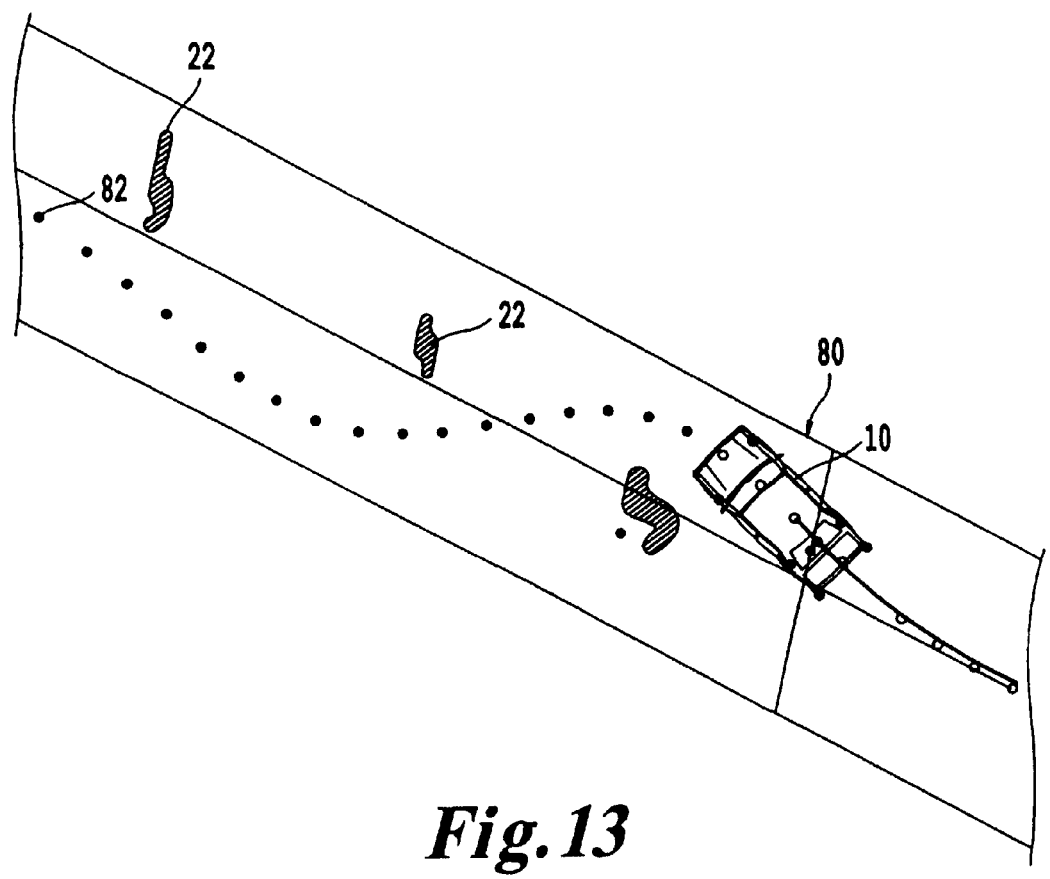

FIGS. 11, 12, and 13 illustrate results of path planning. In FIG. 11, the obstacle detection unit identifies an obstacle 22 by the cluster of data points in the center of the road 80. The path planning unit determines that there is adequate clearance to permit the vehicle 10 to deviate to the right as it advances to the obstacle 22 and then deviate left to return to the center of the road 80. The projected path of the vehicle 10 is shown by path 82. In FIG. 12, the path 82 of the vehicle 10 passes a center of the obstacle 22 to the left and then to the right as shown. The path planning unit has divided the path and the data map into sectors as shown. The first sector at the bottom contains no obstacles and requires no deviation along the planned path 82. The second sector contains an obstacle 22 and requires the path planning unit to determine clearance and a path around the obstacle 22. Further, deviation from the path will rely on the speed planning unit to control the vehicle so as to safely pass the vehicle at a speed suited for the radius of the turn. FIG. 13 shows a vehicle 10 that is about to navigate a series of obstacles in an immediate path of the vehicle.

The present invention recognizes that smooth paths alone are not necessarily drivable by the vehicle. The car should be able to slow down proportionally from straight-aways down to hairpin turns. Once a safe path is designed that avoids obstacles and yet remains drivable, the next step in the planning process is to decide on the speed at which the vehicle should take each section of the path. The speed chosen, in one embodiment of the present invention, is based on the curvature at that point in the path and upon the curvature further down the path. The speed is taken as the minimum of speed for the current curvature and the speed for future path curvature. The future path curvature is defined by a simple function that multiplies the curvature at a given future point by a fractional value that decreases towards zero linearly based upon the distance from the current path point to the given future path point.

The present invention accommodates factors such as vehicle thrust and external forces on the vehicle. System identification is a method used by the present invention by which the parameters that define a system can be determined by relating input signal into a system with the system's response to develop a transfer function that behaves in the same way (or a similar way) as the actual vehicle system. For instance, when attempting to control the speed of a vehicle, the inputs are the brake and accelerator position and the output is the vehicle's speed. If it is assumed that the transfer function, H(s), is first-order, it can be written as $$y(s)=H(s)u(s) \qquad (8)$$

where H(s) is the transfer function of a system, u(s) is the input to the system, and y(s) is the output from the system. System identification was applied to real world data from the vehicle propulsion system to arrive at a transfer function of the vehicle system for example empirically tested for the working vehicle until confidence in an accurate transfer function was obtained.

Accordingly, speed control of the vehicle, according to the present invention, accommodated not only accelerator and brake functions but also accommodated many other factors in the physical engine system. For instance, since the working vehicle had a gas-electric hybrid engine, the coupling of the two propulsion systems was controlled by an inaccessible factory-installed on-board computer tuned for fuel efficiency. Consequently, the mapping of the requested pedal position and the actual position achieved was not linear and had to be remapped in software by empirical determination. In one embodiment of the present invention, the speed of the vehicle is controlled by an integrated proportional-derivative (PD) controller. This controller bases its output on the previous output and on the current error and derivative of the error. In the time domain, the controller can be written as $$u(t2)=(t2-t1)(K_p e(t_2)+K_d e'(t_2))+u(t_1) \qquad (9)$$

where $K_p$ and $K_d$ are tunable coefficients, u(t) is the output of the controller at time t, and e(t) is the error at time t. The error was defined as actual output subtracted from target output. Actual output was reported by the RT3000™, and target speed was derived from the path planning algorithms.

The integrated PD controller was designed and tuned against the derived transfer function detailed above. For instance, the weights (for the proportionate control in the PD controller) needed for optimal performance were derived initially against the computational model of the derived transfer function, and then tuned when operated on the vehicle.

Accelerator and steering wheel control was achieved in the working vehicle using two separate processes, which were both independent of the path-planning systems. Once a path was decided on by the path-planning algorithms, acceleration and steering is used exclusively to remain on the chosen path. Since paths are checked for feasibility upon creation, it was assumed by the control systems that all paths given are possible for the vehicle to achieve. In this manner (although the present invention can use other starting assumptions), it becomes the burden of the control systems to decide how best to proceed in order to follow the selected path.

The steering controller for the working vehicle was a lead-lag controller based on the classical single-track model or bicycle model described ed by Riekert and Schunck "Zur fahrmechanik des gummibereiften kraftfahrzeugs," in Ingenieur Archiv, vol. 11, 1940, pp. 210-224, the entire contents of which are incorporated herein by reference. A lead compensator increases the responsiveness of a system; a lag compensator reduces (but does not eliminate) the steady state error. The lead-lag compensator was based on the frequency response of the system. The lead-lag compensator was similar to that described by D. Bernstein, A students guide to classical control, IEEE Control Systems Magazine, vol. 17, pp. 96-100 (1997), the entire contents of which are incorporated herein by reference. The resulting controller in the working vehicle was a convolution of the two lead and lag functions multiplied by the low frequency gain, which was 0.045. Adaptive estimation parameters were used. Adaptive estimation uses a set of values (parameters) first gained from applying the theoretical functions and then iteratively tests and modifies the parameters in real-world scenarios (e.g., deep sand, rough terrain, and other terrain types) until the parameters are perfected.

$$F_{lead}(s) = \frac{850s+1}{900s+1} \quad (10)$$

$$F_{lag}(s) = \frac{2s+4}{0.2s+1} \quad (11)$$

The discretized controller was implemented as shown in (12) and (13), where x is the state vector, $\dot{x}$ is the derivative of the state vector with respect to time, u is the input vector and $\delta_f$ is the output steering angle as measured at the tire with respect to the centerline. The state vector x is defined as $[y_s \, \psi]$ where $y_s$ refers to the distance from the virtual sensor to the reference path and $\psi$ is the vehicle's yaw rate. The virtual sensor is a point projected a given distance ahead of the vehicle along the vehicle's centerline. This point is commonly referred to as the look-ahead point, and the distance from the look-ahead point to the RT3000 is referred to as the look-ahead distance.

$$\dot{x} = \begin{bmatrix} 0.90475 & -0.00054 \\ 0.00054 & 0.99998 \end{bmatrix} x + \begin{bmatrix} -1.07538 \\ 0.00277 \end{bmatrix} u \quad (12)$$

$$\delta_f = [0.02150 \;\; 0.00005] x + [0.00005] u \quad (13)$$

The input vector u to the controller is defined as $[y_s]$. The output of the controller is the steering angle measured at the tire with respect to the centerline.

The steering and control system in the working vehicle assumed that the relationship between the steering wheel angle and the resulting tire angle was linear and that the location of the vehicle's center of gravity was at the midway point between the front and rear axles. As a measure of safety the magnitude of the $y_s$ signal was monitored to prevent the vehicle from becoming unstable. If $y_s$ were to cross a given threshold, meaning the vehicle is severely off path, the speed of the vehicle was reduced to 2 mph. This allowed the vehicle to return onto the desired path and prevented a possible rollover.

Application Areas

The present invention has widespread application in both autonomously driven and human driven vehicles where the present invention functions respectively in a primary or secondary mode.

In general, the present invention with various of the attributes described above can be included on a variety of driveable units. Such units in one embodiment of the present invention are powered land or water based vehicles, which include for example automobiles, trucks, sport utility vehicles, armored vehicles, boats, ships, barges, tankers, and armored vessels. For watercraft, the present invention could be used not only when navigating in weather or nighttime conditions where visibility is limited and avoidance of other watercraft is desired, but also in docking and lock operations where control of the watercraft between dock and lock structures is important to minimize damage to the watercraft of the dock and lock structures.

The present invention also has application to aircraft. In particular, the application to high speed aircraft will depend on detector sensitivity and accuracy to determine the existence of objects at a sufficient distance from the plane that the plane can take corrective action. However, airport approach and takeoff where the speeds are not high the present invention has utility. For example, on take off and landing, one concern has been whether flocks of birds frequently at the end of the run way area pose risk to engines. Birds are hard to see at distance for the human eye and hard to detect by aircraft radar. Moreover, the present invention has application to helicopters, especially rescue helicopters that frequently land in make-shift areas with obstacles many times hidden from the view of the pilot.

Other application areas include lighter-than-air vehicles (e.g., autonomous weather balloons, autonomous border patrol system including for example remote control small aircraft), other small reconnaissance aircraft, and amphibious vehicles (such as for example land-sea assault vehicles including hovercrafts etc.).

In one embodiment of the present invention, the driveable unit can be an autonomous vehicle without driver-assisted control or a driver-controlled vehicle with computer-assisted control. The autonomous vehicles find application, according to one embodiment of the present invention, in the above noted environmentally dangerous surroundings where a driver would be at risk. The driver-controlled vehicles of the present invention find application in the above noted more conventional environments, where the driver may become disoriented or incapable of physically commanding the vehicle as would occur if the driver suffered a medical emergency or if for example the driver became disoriented under an adverse driving condition. Accordingly, in one embodiment of the present invention, processor 24 is configured to control the vehicle in an event of driver impairment or in an event of immediate path obstruction or in an event of driver request.

As an illustrative example of this embodiment of the present invention, the autonomous vehicle could recognize driver impairment through observing where the driver is driving in comparison to a predetermined path. If the present path of the vehicle and the predetermined path are not similar, the autonomous vehicle could then check, for example, to see if the driver has recently turned the steering wheel and/or pressed on the either the brakes or throttle. Both of the comparison and the steering and brake check can be included in the decision making process, because if the driver were driving on a long straight road with cruise control on, he may not be actively turning the steering wheel or applying brake or throttle. By the same logic, the driver could be driving a path that is not consistent with the autonomous vehicle's path as long as the driver is actively steering the car. In the event that the autonomous vehicle needs to take over, then the autonomous vehicle in one embodiment of the present invention first audibly and visibly warns the driver that it is taking over, then second takes over and steers the vehicle to a safe stopping position as smoothly and safely as possible. If the driver wanted to regain control, the autonomous vehicle of the present invention, in one embodiment, provides a press-button or other input device for the driver to resume control. In another embodiment of the present invention, the driver could press the button (or command input) again to relinquish control to the autonomous vehicle. Hence, the present invention provides in various embodiments a cooperative autonomous driving mode.

In another embodiment of the present invention, a biometric sensor could represent another input device. In this embodiment, the biometric sensor determines if the driver was actively driving through input to processor 24 from for example a heart rate monitor built into the steering wheel of the vehicle. One example of a heart rate monitor that is suitable for the present invention is heart rate used in exercise equipment, which in one embodiment would be integrated into the steering wheel or alternatively could be worn by the driver and be in wireless communication to processor 24. If the processor 24 detected either a complete loss of heart rate or an extremely low heart rate for an extended period of time (for example 5 seconds), the processor 24 is configured to take control of the vehicle. The processor, by monitoring the normal heart rate of the driver when the car was under proper control would have a basis for determining for example if the driver was impaired due to haven fallen asleep at the wheel, having had a stroke, or having had a heart attack. This embodiment could be implemented also in the cooperative mode of operation (discussed above). As before, in one embodiment of the present invention, an audible alarm is issued before taking over control of the vehicle and steering the vehicle to a safe stop. If the driver was in fact not impaired, the driver could simply press a button (or other input device) to take control back from the processor 24.

In another embodiment of the present invention, the autonomous vehicle can be operated repeatedly over a predetermined course. For instance, a human driver presses a button that turns the autonomous vehicle into record mode. The human drives the vehicle exactly like he would want the autonomous vehicle to drive the course. The human driver then presses the button again, and the autonomous vehicle drives the recorded course over and over again with a very high level of reliability and repeatability. (Repeatability is an issue for automobile testers). This capability is also useful for endurance testing vehicles, where the vehicle is driven offroad in hazardous conditions for days in a row in which currently many human drivers are used to perform this task due to the human body's relative weakness. This capability is also useful for driving a vehicle at consistent speeds for long distances. For example, this capability would be useful in testing a vehicle at highway speeds on a race track for fuel consumption performance.

In another embodiment of the present invention, the driveable unit can be used, in conjunction with a mapping program (e.g., running on a laptop), in which the user could select a destination. At this point, the autonomous navigation software would access the mapping software and generate a route (like the software normally does) except in GPS waypoints rather than in human directions like "turn left at main street." At this point, the autonomous vehicle proceeds in normal operation to follow that route. In one embodiment, the mapping software is customized to provide additional information to the autonomous navigation program such as the width of streets and speed limits.

Other application areas for the navigation and control system of the present invention include, but are not limited to: 1) agricultural equipment (e.g., gardening equipment) that performs repetitive tasks or tasks on predicted paths such as for example the harvesting of crops from fields, plowing, grass cutting, etc., 2) mining equipment including for example powered carts that could transport for example goods or people through blackout or smoke filled passages that would normally prevent escape, 3) cave exploration equipment, 4) emergency or police vehicles such as for example fire fighting, ambulances, and rescue squads where visibility impairment need not prevent the emergency vehicles from proceeding forward (as discussed below) or vehicles operating in hazardous environmental conditions where manning of the vehicle places the driver at risk, 5) warehouse management equipment used to store/retrieve pallets, boxes, etc., and 6) toys.

As an illustrative example of the application of the autonomous vehicle of the present invention to a police vehicle, on the Causeway bridge in New Orleans (the longest bridge in the world at 24 miles long), there is a significant fog season. On mornings with a dense fog, traffic is convoyed across the bridge by a police car driving at 35 mph. The low speed is required due to the extremely short visibility. On mornings with intense fog, the bridge is closed as even convoying is not possible. If the lead police car in the convoy were an autonomous vehicle of the present invention operating in the above-noted cooperative mode, the police car could safely convoy in any type of fog, especially when the RIEGL™ imaging sensor is used. The same applies to driving at night. The autonomous vehicle of the present invention is not affected by darkness.

Numerous modifications and variations on the present invention are possible in light of the above teachings. It is, therefore, to be understood that within the scope of the accompanying claims, the invention may be practiced otherwise than as specifically described herein.

The invention claimed is:

1. A method for navigation and control of an autonomous vehicle, comprising:
   producing three dimensional images in a field of view in a direction of travel of the vehicle by scanning repeatedly an emitted beam from the vehicle about a first predetermined axis and through a first angular sector and panning the emitted beam about a second predetermined axis different from the first predetermined axis and through a second angular sector;
   detecting at the vehicle a returned part of the emitted beam scattered by an object;
   determining by a processor in the vehicle a geospatial coordinate of the vehicle, a speed of the vehicle, and a heading of the vehicle,
   determining from the returned part of the emitted beam scattered by the object, by the processor in the vehicle, geospatial coordinates and a size of the object existing in the repeatedly produced 3D images; and
   controlling movement of the vehicle to avoid collision with the object based at least in part on at least one of the geospatial coordinates of the object, the size of the object, the geospatial coordinate of the vehicle, and the speed of the vehicle.

2. The method of claim 1, further comprising:
   storing in a memory a predetermined path of the vehicle between first and second locations; and
   controlling the vehicle to travel between the first and second locations, including adjusting vehicle direction to avoid collision with detected objects.

3. The method of claim 1, further comprising:
   using at least one of a global positioning based system and an inertial navigation based system to determine the geospatial coordinate of the vehicle.

4. The method of claim 1, further comprising:
   determining if the object is in the predetermined path of the vehicle.

5. The method of claim 4, further comprising:
   determining that the object is an obstacle requiring vehicle avoidance.

6. The method of claim 5, further comprising:
   determining a field of view sector where said obstacle exists; and
   storing an obstacle indicator indicative that said obstacle exists in the field of view sector.

7. The method of claim 6, further comprising:
   tracking which field of view sectors have obstacles and which field of view sectors do not have obstacles in order to avoid obstacle collision.

8. The method of claim 5, further comprising:
   producing a contour map of the object.

9. The method of claim 8, further comprising:
determining from the contour map a first contour point on the contour map that is farther away from the vehicle than a second contour point on the contour map;
identifying the object as said obstacle requiring vehicle avoidance if a slope between the first contour point and the second contour point is greater than a predetermined slope and if a height between the first contour point and the second contour point is greater than a predetermined height.

10. The method of claim 5, further comprising:
determining if the obstacle is to be avoided by determining if a geospatial position of the obstacle and a projected path of the vehicle provide vehicle lateral clearance between a top of the obstacle and the vehicle.

11. The method of claim 5, further comprising:
providing at least one of direction and speed control to the vehicle in order to avoid the obstacle.

12. The method of claim 5, further comprising:
obtaining a destination of the vehicle; and
directing the vehicle in order to avoid the obstacle and to return on course to the destination.

13. The method of claim 5, further comprising:
determining a maximum height or depth and a maximum slope for the object in the three dimensional field of view in order to determine if said object is said obstacle requiring vehicle avoidance.

14. The method of claim 1, further comprising:
determining first and second points on a contour map of the object,
determining if said first point is farther away from the vehicle than said second point,
determining a slope between the first point and the second point,
determining if said slope is greater than a predetermined slope, and
determining if a height between the first point and the second point is greater than a predetermined height, and if so, determining the object is an obstacle requiring vehicle avoidance.

15. The method of claim 1, wherein controlling movement of the vehicle to avoid collision comprises controlling movement of a land-based vehicle.

16. The method of claim 15, wherein controlling movement of a land-based vehicle comprises controlling movement of at least one of an automobile, a truck, a sport utility vehicle, rescue vehicle, an agricultural vehicle, a mining vehicle, an escort vehicle, a toy vehicle, a reconnaissance vehicle, a test-track vehicle, and an armored vehicle.

17. The method of claim 1, wherein controlling movement of the vehicle to avoid collision comprises controlling movement of a watercraft.

18. The method of claim 17, wherein controlling movement of a watercraft comprises controlling movement of at least one of a boat, a ship, a barge, a tanker, an amphibious vehicle, a hovercraft, and an armored ship.

19. The method of claim 1, wherein controlling movement of the vehicle to avoid collision comprises controlling movement of an aircraft.

20. A method for navigation and control of an autonomous vehicle, comprising:
producing three dimensional images in fields of view in a direction of travel of the vehicle by scanning repeatedly an emitted beam from the vehicle about a first predetermined axis and through a first angular sector and panning the emitted beam about a second predetermined axis different from the first predetermined axis and through a second angular sector;
detecting at the vehicle a returned part of the emitted beam scattered by an object
determining by a processor in the vehicle a geospatial coordinate of the vehicle, a speed of the vehicle, and a heading of the vehicle,
producing a contour map of the object based on the returned part of the emitted beam scattered by the object;
determining from the contour map a first point on the contour map of the object that is farther away from the vehicle than a second point on the contour map of the object;
identifying by the processor in the vehicle the object as an obstacle to be avoided if a slope between the first point and the second point is greater than a predetermined slope and if a height between the first point and the second point is greater than a predetermined height.

* * * * *